(12) United States Patent
Vikstrom

(10) Patent No.: US 6,536,215 B1
(45) Date of Patent: Mar. 25, 2003

(54) METHOD FOR OPTIMALLY OPERATING CO-GENERATION OF ELECTRICITY AND HEAT AND OPTIMALLY OPERATING DISTRICT HEATING POWER PLANT

(76) Inventor: Goran Vikstrom, Kulimaentie 6, FIN-67400 Kokkola (FI)

( * ) Notice: Subject to any disclaimer, the term of this patent is extended or adjusted under 35 U.S.C. 154(b) by 0 days.

(21) Appl. No.: 09/914,201
(22) PCT Filed: Feb. 24, 2000
(86) PCT No.: PCT/FI00/00149
§ 371 (c)(1), (2), (4) Date: Nov. 20, 2001
(87) PCT Pub. No.: WO00/50740
PCT Pub. Date: Aug. 31, 2000

(30) Foreign Application Priority Data

Feb. 24, 1999 (FI) .................................................. 990391

(51) Int. Cl.[7] .............................................. F01K 27/00
(52) U.S. Cl. ...................... 60/641.1; 60/641.6; 60/645
(58) Field of Search .......................... 60/641.1, 641.6, 60/641.7, 645, 685

(56) References Cited

U.S. PATENT DOCUMENTS

| | | | |
|---|---|---|---|
| 4,006,857 A | | 2/1977 | Adrian ........................ 237/2 B |
| 4,380,909 A | * | 4/1983 | Sung ............................. 62/79 |
| 4,503,337 A | | 3/1985 | Häfner et al. ................ 290/4 D |
| 4,736,111 A | * | 4/1988 | Linden .......................... 290/2 |
| 4,873,840 A | * | 10/1989 | Gilliusson .................. 62/238.6 |
| 5,584,185 A | * | 12/1996 | Rumble et al. ................ 62/115 |
| 5,903,060 A | * | 5/1999 | Norton ........................... 290/2 |

FOREIGN PATENT DOCUMENTS

| | | |
|---|---|---|
| DE | 26 12 058 | 10/1977 |
| DE | 28 38 389 | 3/1980 |
| DE | 32 26 429 | 1/1984 |
| WO | WO 89/07699 | 8/1989 |
| WO | WO 93/10335 | 5/1993 |

* cited by examiner

Primary Examiner—Hoang Nguyen
(74) Attorney, Agent, or Firm—Connolly Bove Lodge & Hutz LLP

(57) ABSTRACT

A method for optimally operating co-generation of electricity and heat in which the district heating power range is divided to a lower range and a higher range is characterized in that base load electricity and regulation electricity are produced with a steam turbine operating like a condensing turbine; the lower heating power range (B) is produced mainly by heat pumps using the energy of the exhaust steam of the turbine as an energy source; peak-load power and wintertime regulation electricity are produced with a peak-load engine; and the higher heating power range (A3, A4) is produced partially by heat pumps using said energy as the energy source and partially by the exhaust gas heat of said peak-load engine. Both the electricity and the heat are produced with a remarkably higher fuel utilization rate and significantly more electricity in relation to heat is produced than with conventional district heating power plants. The invention concerns also an optimally operating district heating power plant realizing the above method. At the initial stage of the operation of the district heating power plant, the district heating load being partial, a bigger amount of electricity may be produced of a fuel unit than at the final stage of the operation with a full district heating load. Extra peak power at short notice may be produced with the peak-load engine with a better fuel utilization rate than with the previously known solutions.

15 Claims, 19 Drawing Sheets

METHOD FOR OPTIMALLY OPERATING CO-GENERATION OF ELECTRICITY AND HEAT AND OPTIMALLY OPERATING DISTRICT HEATING POWER PLANT

The invention is related to a method for optimally operating co-generation of electricity and heat in which method the district heating power range is divided to a lower range and a higher range. The invention is also related to an optimally operating district heating power plant.

The two main sectors of energy policy are power sector and heat sector. Energy sector is combining these two sectors. In the energy activities power production (electricity production) is combined with heating to a combined method by which power and electricity may be co-generated with a better efficiency in comparison with separate production. In this combination the production of electricity is given a priority to all the benefit obtained. Electricity is made cheaper than it really is at the expense of heat: as the fuel costs are divided on the basis of cause, the portion of electricity is about three times that of heat; as the investment costs are divided on the same basis, the portion of electricity is 15 times that of heat; and in the co-generation of electricity and heat only 5% of the labour costs should be allocated to heat and the rest to electricity.

Despite of this, electrical heating is still recommended in our country by brainwashing people with false information to use electricity to heating although the specific heat consumption is the largest in the EU countries and is in Finland 50% larger than in Sweden where the state today is paying a subvention to the real estate owners who abandon using electricity for heating.

In the co-generation of electricity and heat with a conventional district heating turbine, the efficiency varies between 85 and 50%. In a system properly designed the annual average is about 70%.

Earlier, the efficiency of heating in separate heating of high-rise buildings was about 90%. Unfortunately, in that kind of heating, however, the more valuable portion of the fuel, the capacity to work, is lost. The use of fuel to produce only heat was then the biggest disadvantage of the energy sector.

As far as the utilization of fuel is concerned, the best known solution until today is to use a power engine together with a heat pump in which combination fuel may be utilized in such a way that about 1.4 to 1.6 kWh heat may be obtained from one kWh fuel.

In a so called condensing power plant producing only electricity, heating capacity of the fuel is lost with the result that fuel efficiency is only about 42%.

Because the quota of district heating turbines in our country is already built with conventional applications—in view of energy policy built too far—(coal-fired) condensing power is the only alternative of conventional centralized power management which during the present decade is able to provide additional power as firm electricity. Other outlines of centralized power management offer solutions which could be under production in about a decade, at the earliest.

In the condensing power application and district heating activities on the basis of the use of a boiler the significance of the indigenous renewable fuel is very small due to large losses related thereto. The losses of the condensing power process are commonly known. The losses of the district heating systems are known only by a few experts. The losses of the distribution piping are about 12 to 20% and are larger than the energy price of the used fuel because the energy is produced with quite low efficiency. Conventionally, a district heating system has been a temporary phase of gathering power as a solution aiming at the production of district heating electricity, and the district heating activities in the final mode thereof are given reasons by the low cost of the heat as a by-product of the power production: only one half of the energy price of the used fuel. District heating as the activity based on the use of a boiler is limping also in regard to boiler losses. Usually, the heat is produced with only one boiler the power of which is equal to the maximum demand of district heating. The radiation loss of a boiler is constant and about 3.5% of the rated power. The demand of the district heating power varies widely in different seasons being in the warm periods of summertime only about 8% of the maximum power, and the annual average thereof is about 30%. So, the radiation loss is about 40% in summertime and about 12% as an annual average. The annual averages of the losses of the system rise to about 30%, and thereby the efficiency as a whole is often only about 70%. Moreover, the summertime loads are often run with expensive burning oil because of the bad controllability of a boiler.

In the centralized power management, the only production mode of additional firm electricity during the decade just begun is (coal-fired) condensing power, and so the additional capacity of electricity involves always, due to the use of fossil fuel, carbon dioxide emissions increasing the greenhouse effect. Besides this, thermal load is caused to the environment by the anergy of exhaust steam the produced amount of which is about double the produced unit of electricity.

U.S. Pat. No. 4,006,857 presents a method of utilizing waste heat of large power plants. The method in comparison with the present invention is considered later in this specification.

An object of the invention is to provide a district heating power plant which operates with a principle of co-generation of electricity and heat and for which: the investment costs are lower than for a conventional district heating power plant; the fuel consumption is smaller than for a conventional district heating power plant; and the methods of control are more extensive, faster and more easy to manage than for a conventional district heating power plant.

A method according to the invention for optimally operating co-generation of electricity and heat in which method the district heating power range is divided to a lower range and a higher range, and an optimally operating district heating power plant of the invention are characterized by features presented in the accompanying claims.

The invention and some embodiments thereof are described in greater detail in the following, with reference to the accompanying drawings, in which:

FIG. 1 presents schematically the power dividing principle of the district heating power of method and optimally operating power plant of the invention;

FIG. 2 is a IS plot presenting a comparison between the optimally operating district heating power plant and a conventional district heating power plant;

FIG. 3 is a duration curve presentation indicating a comparison between the methods of the invention and U.S. Pat. No. 4,006,857;

Figure 1:
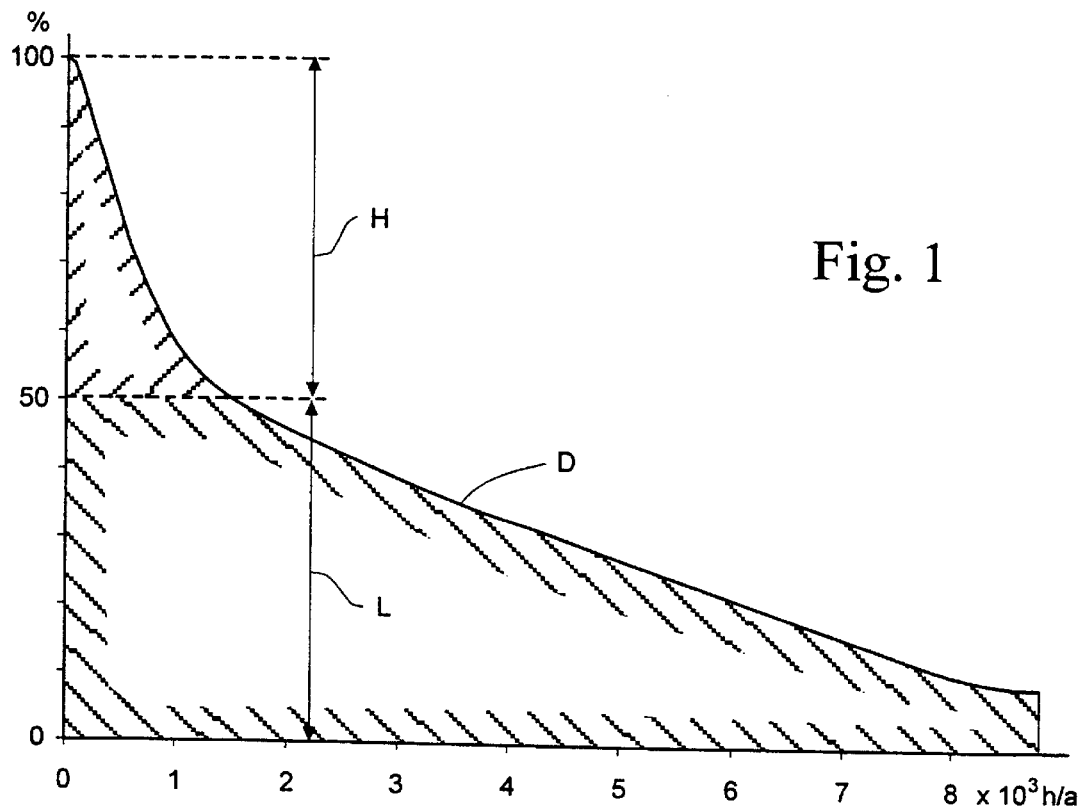

The method and the power plant of the present invention are based on utilizing the anergy of the exhaust steam coming along with the district heating power plant as an excellent energy source for district heating activity with heat pump principle and high coefficient of performance. (Anergy is that part of energy which form a balance with the environment and which, for the low temperature level, cannot be utilized directly as electricity or heat.)

As to the steam plant part, the optimally operating district heating power plant differs from a conventional district heating power plant mostly in that the mass flow is expanded longer than in a district heating turbine whereby the turbine is operating with the control characteristics of a condensing turbine giving at the same time more electricity per fuel unit, i.e. the product for which the power plant investments, which are 15 times bigger than the heating investments, must be given reasons for. When enough cooling water is available for the cooling of the steam plant part in the local area, the cooling of the power plant may be planned, in this respect, with conventional applications, whereby the power plant may, as a new type of power plants, compete successfully with the earlier power plant solutions. However, it is then, as the conventional condensing power plants, dependent on the cooling water and so cannot be located at any place in the countryside. In the areas where the availability of water is assured, the optimally operating district heating power plant is surely competitive as such a special solution, too. As a solution which may be located freely at any place, the optimally operating district heating power plant will be planned with cooling of the exhaust steam by gas which, at least at the early stage of development, will be air. Because this application at this stage of the development is most promising, the following list of the advantages of the optimally operating district heating power plant is based on the consideration thereof. If a water cooling solution would be used instead of an air cooling solution, the superior quality in comparison with the earlier solutions would be almost equal.

The superior quality in comparison with the earlier methods of co-generation of electricity and heat is in the first place consisting of the following main factors:

1. Dividing the needed district heating power to subranges (FIG. 1):
   a continuously operating steam power plant with higher investment costs (about 6500 FIM/kW) for providing base load electricity and control electricity; and
   a periodically operating peak-load power plant, suitable for this purpose, with lower investment costs (about 1000 FIM/kW) primarily for providing winter time intermediate load power and peak-load power.
2. Almost massless open air cooling system most commonly used for cooling by condensing the exhaust steam of the steam power plant, which cooling system offers the following advantages:
   It makes possible to produce higher electrical power from a mass flow and a fuel unit than with a water-cooled turbine because the temperature of the incoming cooling air is lower than the temperature of seawater, for example.
   It makes possible to modify the heat delivery surface in comparison with the conventional water-cooling system so that the cooling madium (air) is on the outside of and the cooled medium (condensing exhaust steam) is on the inside of the heat delivery surface, which make possible to use the technology used in the gas heat transfer (ribbed heat delivery surface) and to maintain a reasonable equivalent heat delivery surface which is important for the air cooling.
   It makes possible to use materials significantly cheaper than conventional special-purpose brass grades for the heat delivery surface because clean air and steams inhibited with the water treatment of the power plant are not corrosive. Also, spot corrosion caused by the sludge of a water-cooling system is not to be afraid of.
   Condenser tube cleaning equipment necessary for a water-cooling system are not needed.
   Cleaning measures (a lot of work) typical for water-cooling systems are not needed during shutdowns.
   Because the cooling medium is on the outside of the heat delivery surface, it may be installed in such a position that it is emptied by draining and is drying of itself as the plant is withdrawn from operation, whereby the risk of corrosion is eliminated.
   Air cooling system makes possible fast control measures of electric power which is not possible with a conventional district heating power plant. Especially at the initial stage of the operation, the connected district heating power being low, the control range of the electric power is significantly larger than with a conventional district heating power plant. The control characteristics of the novel power plant are determined, like for a condensing power plant, by the thermal loadability of the turbine whereby the rates of change of the power are similar to those of a condensing power plant.
   In view of the presentation of FIG. 2, air cooling system together with the production of district heat with heat pumps makes possible an additional recovery of electricity per fuel unit in comparison with production of electricity with a conventional district heating turbine. Arrow E1 shows the additional recovery of electricity at the final stage of the operation as the district heating power in its entirety is put into effect. Arrow E2 shows the same at the initial stage of operation as only a part of the district heating power is put into effect, and arrow E3 shows the difference in the recovery of electricity during the coldest period of the cold season when the temperature of the output water of a conventional district heating turbine is raised to the maximum.
3. The investments of a district heating power plant may be allocated according to the increase of the need of district heating:
   The efficiency of the presented novel power plant is about 90% in so far as cogeneration of electricity and heat is concerned, and about 36% in so far as production of only electricity is concerned. In a high-power station operating as a condensing turbine plant, the efficiency is about 42%. As to the quality of fuel utilization the plants are competing as follows:

$$90 \cdot X + (100-x) \cdot 36 = 100 \cdot 42$$

wherefrom X obtains the value 11.1. This means that the presented power plant of a new type is, in view of the utilization of fuel, more reasonable than a high-power plant as more than 11.1% of its electricity is produced on the basis of co-generation of electricity and heat. The operation of the power plant may be started with about 11% of the final district heat power and let the reserve be almost 90%. Thus, the budget of the initial stage is burdened only by about 11% of the heating part investments and the rest are activated later. Therefore the repayment period of the plant is shortened.

4. The small self-driving power of the heat pumps:

As the district heating operation is started with only partial power of about 11% and the additional power of wintertime district heat is produced with a diesel driven heat pump which is, in this season, advantageous in comparison with electrically driven heat pump, the need of self-driving power for heat pumps is insignificant and so the net electricity production of the power plant is quite high. Also the unusually high coefficient of performance thanks to the high temperature of the energy source has a contribution to the same effect.

5. Control characteristics:

Because the controllability of the steam plant part is as good as the one of the condensing power plant and the increase of the power to the full power is possible within about two minutes from the moment of starting, the total controllability of the optimally operating district heating power plant is very good in comparison with other district heating power plants.

6. Crisis time use:

Because the power plant proposed is able to produce the electricity of the region as a whole, it may be planned in such a way that it may be operated as an independent production unit, in so called island operation, in the situations, e.g. crisis situations, in which there is no support from a nationwide electric network. A significant advantage during long-time cut-offs is self-sufficiency of the fuel at least in regard to the base load electricity and heat (about 90% of the annual amount of fuel).

7. Superiority in the production of electricity.

Due to the air cooling together with the heat pump heating application, the optimally operating district heating power plant produces, in comparison with a district heating power plant operating with the same parameter, more electricity from the same amount of fuel as follows:
  at the final stage of operation as the intended final power of the district heating plant is put into effect, about 21% more;
  at the initial stage as about 11% of the district heating power is put into effect, about 42% more; and
  in the cold season with the limit value of the temperature of the output water (120° C.), about 62% more.

In comparison with a high-power district heating plant with intermediate superheating:
  at the final stage of operation as the intended final power of the district heating plant is put into effect, about the same;
  at the initial stage as about 11% of the district heating power is put into effect, about 22% more; and
  in the cold season with the maximum value of the temperature of the output water (120° C.), about 39% more.

In comparison with the system of U.S. Pat. No. 4,006,857:
  at the final stage of operation as the intended final power of the district heating plant is put into effect, about 360% more;
  at the initial stage as about 11% of the district heating power is put into effect, about 400% more; and
  in the cold season with the limit value of the temperature of the output water, about 63% more.

An explanation for the fact that the turbogenerator in the optimally operating district heating power plant produces more electricity at the initial stage with not full district heating power is that the final temperature of the cooling air may be kept lower than at the final stage because the air, as the heat pump power is lower, is cooled less and does not reach the frosting point although the back-pressure of the turbine is lowered for providing a higher electric power.

A comparison in greater detail between the optimally operating district heating power plant and U.S. Pat. No. 4,006,857 is made with reference to FIG. 3. There, the rectangular area C1, C2 presents the anergy of the exhaust steam of a steam power plant which is the basis of the comparison. The upper duration curve of the district heating describes the way in which about 60% of the anergy of the power plant is utilized by means of the principle following the optimal design of the district heating power of the optimally operating district heating power plant. Because cutting of the peak is not known in U.S. Pat. No. 4,006,857, the power peak P, which lies on the same power line as the power of the exhaust steam on the horizontal line of the rectangle, as a whole is to be obtained from the anergy of the exhaust steam. The lower duration curve D2 shows which portion may be utilized with, i.e. about 30% of the energy of the exhaust steam (the area confined by the curve and the coordinate axes). As may be found, only about one half of the anergy of the exhaust steam may be utilized with this principle of heat production in comparison with the method of the optimally operating district heating power plant (curve D1). If the same amount of electricity is wanted to be produced according to the system of U.S. Pat. No. 4,006,857 as with the steam plant part of the optimally operating district heating power plant, thanks to the unlimited controllability thereof, the power plant thereof is to be provided with a supplementary separate cooling system which removes about 70% of the anergy of the power process. Otherwise the production of electricity is lowered to far less than 30% of that which the optimally operating district heating power plant is able to produce. For this kind of cooling the water with sufficient qualities for drinking water production is too valuable, and so some other cooling medium is a precondition. The method of U.S. Pat. No. 4,006,857 is quite seldom justifiable. Although said supplementary cooling could be arranged, the efficiency of the plant would be significantly lower than the efficiency of the optimally operating district heating power plant because 1.75 times the amount of the anergy of the exhaust steam of the steam power plant derived from the fuel would be wasted in comparison with the optimally operating district heating power plant.

8. Differences in the investments needed:

The average investment costs per electric power unit of the optimally operating district heating power plant in comparison with the competing systems:
  about 58% of the investment costs of a conventional district heating plant; and
  about 45% of the investment costs of the system of U.S. Pat. No. 4,006,857.

So, the anergy of exhaust steam is harmful or of no value. The use of renewable fuel does not increase greenhouse effect due to the ecological balance. Moreover, when utilizing the anergy of exhaust steam as an energy source of a heat pump in a small-scale power plant, the load to the environment is kept small, especially as air cooling is used. This consideration leads to the fact that a small power plant utilizing renewable fuel always provides the locality thereof with a free of charge energy source, which due to the temperature level thereof is most suitable for running heat pumps, the utilization rate of fuel being even 2 at the highest.

A small-scale power plant producing energy (electricity and heat) from renewable fuel does not consume (utilize) our fuel reserve, as the power plants utilizing fossil fuel do, because new fuel is growing at the same rate. The same concerns also the combustion of municipal waste because more waste is produced all the time as far as this kind of consumption is allowed. As condensing electricity is produced from fossil fuel, the efficiency is only about 35%, i.e. unnecessary load of 65% is caused to the nature. In the optimally operating district power plant this portion is only 10 to 20% at the final stage of of the operation when the thermal load is built. Because a lot of wood is used for other purposes, the growth of the forests is always significantly larger than the amount of fuel wood, and so the amount of carbon dioxide corresponding to the not utilized portion of 10 to 20% of the anergy emission of the power plant is consumed in the further growth of the forests and does not increase greenhouse effect.

Accordingly, the effect of a small-scale power plant is such that it always reduces the greenhouse effect of the fossil fuel with the portion of 65% of the electric power thereof as well as the use of fossil fuel reserve to harmful condensing power plant losses with the same amount of 65%. Because no useful heat is produced in the production of condensing electricity, the heat corresponding to the power portion of a small power plant obtained as useful heat must, for covering the total demand of the society, be produced separately with the boilers of a district heating system wherein the efficiency of the process is 60 to 70%. This system causes the amount of about 35% of above mentioned load. Thus, the advantage of a small power plant in comparison with a combination of a condensing power plant and a district heating system is 65+35=100%. This results in that there are grounds to consider the anergy portion of the optimally operating district power plant as non-fuel-originated which means that the whole portion thereof reduces the use of fuel otherwise with the effect of the amount thereof, and at the same time reduces the greenhouse effect with the amount of the corresponding power portion of the condencing electricity production, the portion of the useful electricity as well as the portion of the losses.

A novelty of this patent application is in that as the peak-road power engine is co-operating with the heat pump which utilizes the worthless anergy of the exhaust steam of the steam power plant as an energy source, it is always possible within the scope of the present invention to produce an amount of peak-load electricity the energy portion of which is quite small but the power is relatively high, in such a way that only about 0.5 kWh fuel is consumed per unit of produced electricity and heat. The applicant's Finnish patent application no. 972458 "Efficient system for utilizing energy" provides general framework for production of peak-load electricity with approximately as good a utilization rate of fuel by utilizing the environmental anergy in a location where a suitable source of anergy is available. However, this solution can not generally be combined with the operation of a power plant because the only energy source which is available everywhere is the ground, and so large a land area that it satisfies the power demand of a district power plant is seldom available. Moreover, providing the ground area with systems for raising the coefficient of performance, e.g. with insulating layers, is difficult in this solution. On the contrary, the "artificial" energy source of the optimally operating district power plant, the anergy of the exhaust steam, is always an ideal solution for a power plant application, in regard to both the location, the quality, and the time aspects of realizing the solution. The co-operation of the peak-load power engine of the optimally operating district power plant with the heat pump utilizing the anergy of the exhaust steam of the steam power plant as an energy source differs from the solution of FI 972458, for example, in that it is able to utilize parts of the power plant, like a feed water tank, or a condensation water tank, or a supplementary water tank, to replace separately for buffer purposes built tanks of the solution of FI 972458. Thus, the buffering may be started by raising the level of the feed water tank by means of supplementary water to the maximum thereof after which the level of the condensation water tank may be raised, and despite of that, the temperature of the isolated supplementary water tank may be raised by circulating supplementary water through a heat-exchanger. As the temperature level of the anergy of the exhaust steam is significantly higher than that of any environmental anergy, a higher coefficient of performance of the heat pump is achieved with the co-operation of the peak-load power engine with the heat pump of the optimally operating district power plant than with the arrangement of FI 972458 with the methods of raising the coefficient of performance. As the optimally operating district heating power plant is run with a reduced output at the initial stage of the operation, the buffer tank volume of the peak-load power equipment may be reduced also by replacing it with the fuel drying power during the peak-load hours of electricity consumption. Then, the tank volumes may be raised later when necessary. These facts reduce need of investments at the initial stage.

In the power plant applications, the peak-load power portion will often be divided between the own peak-load power equipment of the district heating power plant and the efficient system of utilizing energy of FI 972458 exploiting environmental anergies and being provided with systems for raising the coefficient of performance, in such a way that the former produces peaks with longer cycles and the latter peaks with shorter cycles.

The efficiency of the optimally operating district power plant is at the initial stage as the district heating power is only 11% of the final power the same as with a big condensing power plant, i. e. about 42%, whereby it produces 21% more electricity per fuel unit than a big district heating power plant with intermediate superheating, and about 68% more at the final stage as all the district heating power is put into effect whereby it produces the same amount of electricity per fuel unit as a big district heating power plant with intermediate superheating.

It is known that the economical rating of a district heating turbine involves that the district heating power is cut at a level of about 50% of the maximum power and the power portion above this limit is recommended to be produced with an oil-fired boiler. This kind of instructions are given in Tekniikan käsikirja (Handbook of Technique), for example. This kind of rating involves that the temperature of the output water, which at the lowest in summertime is about 70° C., is increased with the heat exchangers of the turbine to a temperature which is 90° C. at the highest, and the need of raising the temperature above this is satisfied with a boiler. In this way, the economy of a district heating power plant is the best possible, but it produces only intermediate load energy and base load electricity and not at all peak-load electricity which is often desirable. In the present optimally operating district power plant the production of the peak-load portion of the heating power with a boiler is replaced with a peak-load power plant producing peak-load electricity and, with exhaust gas, peak-load heating power which in co-operation with a heat pump converting anergy of the exhaust steam of the steam plant part to useful heat provides a system in which the peak-load energy has significantly lower costs than in the earlier production methods of the peak-load energy.

The experts in the district heating field also know that, in regard to control characteristics, a district heating power plant is an inflexible and often expensive solution the control range of which, moreover, is at the lowest in the wintertime as the cost of the daily control power is the highest. This is explained in the following.

In the design of the trunk pipework of the water district heating systems, flow rates of water higher than 3 m/s are not allowed. When selecting an economical rating for the trunk pipes the flow rates close to this limit (e.g. 2.8 m/s) are allowed for wintertime distribution of maximal heating power. Thus, large changes in the flow rate are not possible. The increase of the electric power by raising the flow rate is tightly restricted. The main reason for restricting the flow rates of water is the stress caused by the large masses of water at the fixed points of the pipework. The mass of water the weight of which may be more than several freight trains flows at a speed of about 11 kilometres per hour in the trunk pipes the diameter of which may be 0.5 to 1 meter and which sometimes make curves of 90 degrees at the street corners. It is obvious that the forces directed to the fixed points become excessively high if the flow rate is raised.

Another way of controlling electric power in district heating power plants is to change the output water temperature to deviate from that required by the need of district heating, which may cause problems difficult to be seen beforehand. The raise of the output water temperature to achieve additional electric power causes that the return water temperature turns upwards. The raise of the return water temperature cuses later (often with a delay of several hours) a drop of the electric power. The delay varies depending on several factors, like the season (outdoor temperature level), the time of a contol actions (which time of day), the durance of the control action, and so on. Therefore, it is almost impossible to know the after-effect of a control action; does the drop of the power coming after a delay occur at a suitable time or at another peak consumption time of a day.

A third way used to control a conventional district heating power plant, the use of an auxiliary cooler, involves also several problems. During a cold period, as the advantage available from the control would be the greatest, the whole admission capacity of the turbine of the power plant is bound to satisfy the power requirements of the district heating loads. The increase of the admission capacity because of the control power is not reasonable because it deteriorates essentially the average annual efficiency, the main factors being the decrease of the production of electricity per fuel unit caused by the deterioration of the isentropic efficiency of the turbine and the deterioration of the efficiency of the boiler and the decrease of the average annual power of the boiler which are caused by the portion of the radiation loss the absolute value of which is defined by the rated power of the boiler and which may raise from the theoretical value of 3.5% sometimes even to a value greater than 20%. The increase of the admission capacity for which the reasons are given by the use of an auxiliary cooler are followed by also other factors affecting disadvantageously the efficiency of the plant, such as the increase of the consumption of the self-driving electricity due to the overrating of the continuously driven auxiliary equipment. The production of the auxiliary electricity as a control power by means of an auxiliary cooler in a conventional district heating power plant competes unsuccessfully with condensing plant electricity, the main reason for which is, in addition to efficiency related drawbacks, the unreasonably high specific heat consumption from which heat the major portion is lost. This fact may be expressed also by saying that the amount of electricity obtained from a fuel unit is significantly smaller than the corresponding one of the condensing power process.

With the optimally operating district heating power plant presented here, auxiliary cooling is proposed in relation to special applications for improvement of existing conventional power plants and utilization of low temperature condensing power technology (e.g. That based on freon turbine technology) for producing additional electricity from the waste heat of the auxiliary condensing steam.

In the solution presented in the above mentioned U.S. Pat. No. 4,006,857, the cooling of the exhaust steam is made by water wherein the water cooling system is technically connected with other cooling processes. Obviously, this kind of process is not able to compete even with our conventional district heating plants in regard to controllability. Within the scope of the method of said patent there is likely no basis for arranging competition for an independent power plant type. If the method presented is to be applied, it will probably be a special solution with a lot of employment which may be only a supplementary unit of a company carrying on energy business. The method presented here, the optimally operating district heating power plant, is in all the embodiments thereof able to compete as an independent unit with other modes of the energy production. The solution of U.S. Pat. No. 4,006,857 differs essentially from the operation principles of the optimally operating district heating power plant. In said method, the raw water with a quality of domestic water conducted through the condenser of a power plant is transferred by means of a distribution grid via heat consumption points to the drinking water supply plant and a portion thereof to process cooling points. The heat pumps are located in the vicinity of the heating points and not at the power plant like in the optimally operating district heating power plant. In the last mentioned plant, the whole district heating portion produced with heat pumps is extracted from the anergy of the exhaust steam of the steam power plant and is transferred in the form of heat produced by heat pumps to a closed district heating grid which is realized with known technology and is operating in a conventional way, whereby the distribution of heat is carried out with an inhibited water circulation provided with deoxidation. In relation to this, a novelty in the present invention is the source of energy (the anergy of the exhaust steam). All the other items concerning the operation of the heat distribution grid include known prior technology which is proved to function. U.S. Pat. No. 4,006,857 does not consider material questions, or the question of the point in the process where the water is handled, or the question how metallic parts, fixtures, balancers, e.t.c are prevented from corroding. If the raw water is treated and inhibited to be suitable for the distribution network, it is no more suitable for drinking water. If it is not treated, there must be no parts in the distribution network susceptible to corrosion. In view of the cooling considerations, it is not reasonable to conduct the cooling water via the condenser. Moreover, the raw water suitable for drinking water is too valuable to be used for cooling because the availability of this kind of water is normally restricted, especially if groundwater is concerned. For providing one megawatt of electric power in a condensing power plant, about 72 cubic meters cooling water per hour is needed which means that a small power plant of 10 MW uses about 633,000 cubic meters cooling water annually. This corresponds to the annual domestic water consumption of about 21,000 households. The electric power demand of such a community is about 170 MW. In the climatic conditions of Finland the demand of heating power of such a community were about 300 MW. If this amount of heat were produced by district heating, the electric power of the district heating power plant were about 100 MW. These calculations show the category in which the system of U.S. Pat. No. 4,006,857 is competing. A lot of development should be done to make the idea function, and it is always a special solution without any common applicability. Claim 1 of the mentioned patent document claims definitely that the cooling of the condenser is carried out by water which means that air cooling is out of question. Also, the location of the heat pumps is defined to be in the vicinity of consuming points which excludes the possibility of optimizing the production of heat in accordance with the principle of cutting the power range and with the use of a peakload power plant in co-operation with heat pumps utilizing the anergy of the exhaust steam of the steam power plant as a source of energy. For achieving a competitive position in regard to the optimally operating district heating power plant, the peak-load power should be produced by applying FI 972458 (Efficient system for utilizing energy) in which, instead of utilizing the exhaust steam of the steam power plant of the optimally operating district heating power plant, anergy of the environment from any available source of energy is utilized as processed to heat together with the exhaust gas heat of the peak-load power plant.

It is well-known that the process efficiency of the condensing power plant producing basic electricity is only 35 to 42% because "the condensing heat is wasted" (the anergy passing away from the condenser can not be utilized). It is also well-known that the efficiency of a so called back-pressure turbine plant is better, i.e. about the same as the efficiency of a boiler producing only heat. However, producing electricity with the back-pressure method gives the remarkable advantage that the process efficiency is thought to be better than with condensing electricity production also in regard to the more valuable product of the process, i.e. the electricity. Thus, applying these principles, electricity may be produced as follows:

In an industrial back-pressure power plant with an average process efficiency of about 85% beacause it is driven almost all the year with full power.

In a district heating power plant with an average process efficiency of 65 to 75% depending on the rating of the plant. In a properly rated district heating turbine plant the process efficiency is at the best about 85% as the turbine is driven with full power about 1,500 hours per year during the coldest wintertime.

Moreover, it is well-known that the other product of the district heating power plant, i.e. heat, is transmitted to a district heating grid with heat-exchanger technique whereby the temperature of the district heating water is raised by condensing the steam taken from the turbine for this purpose. The temperature of the circulated water is raised usually from a temperature of 45 to 50° C. This means that the temperature of the water returning to the power plant is about 50° C. When optimizing the heat delivery surfaces and the space questions of the heat-exchangers of the subcentres of the district as well as the radiator network of the secondary circuit of the heating systems, the lowering of the temperature of the return water essentially under this level is not considered reasonable. Therefore, in the art of power plant engineering the portion of the energy the temperature of which is under 50° C. is considered to be of no value, so called anergy. (The concept anergy means that part of the energy which because of the low temperature level thereof can not be processed to electricity or heat or which because of the small amount is not worth of investments for utilization.) Let us keep in mind that a higher temperature of the return water is only disadvantageous for the power plant process because the production of electricity is reduced for the impaired vacuum achieved in the condenser because of the raise of the temperature of the return water.

It is also well-known that the above temperature level of 45 to 50° C. is considered to be too low for heating residential or office buildings with normal central heating systems. The rated temperatures thereof are normally 90/60° C. or 80/60° C. As anergy of the above temperature level of about 50° C. or a lower level is concerned for heating, the temperature level is usually raised with heat pumps to the area of the mentioned normal operating temperatures. This anergy, although it may be a good source of energy for heat pump applications, is thus to be considered to be of no value, and it attains the new value thereof from the driving power of a heat pump.

On the other hand, it is also known, especially in other countries, that the energy products of a power plant have different prices. So, the electricity, the production of which needs the most processing, is the most expensive, the next expensieve is industrial steam, district heat is the cheapest, and the part which is at so low a temperature level that it can not be utilized as electricity or heat is considered to be of no value (=anergy). Although the anergy passing away from the condenser is to be considered to be of no value in view of the power plant process, which is shown also by the fact that there is no price for it, from the point of view of the heating sector it is, however, quite valuable although always free of charge. This is valid because this kind of relatively warm anergy is a good energy source for heat pumps while, on the other hand, it is detrimental from the point of view of both the power plant and the surroundings.

However, it is also known that anergy may be processed to heat and by today's technology partially to electricity, too. Processing to heat may be carried out by heat pumps, for example, and to electricity by means of a low temperature engine like the one based on Rankine cycle of organic fluid and so called Boost Energy Converter tecnology. From the recent steam boiler applications it is also known that the combustion air of a boiler may be heated by a heat pump whereby the anergy of the combustion gases is processed for this purpose by cooling the gas flow. So, the efficiency of the boiler is improved.

Furthermore, it is known that in the development of an industrial condensing power plant the most of the investment costs are related to the industrial process, and the need for further investments for electricity production is quite small, which results in that industrial condensing power is the cheapest way of producing electricity. Moreover, it is known that electricity production with an industrial condensing power plant does not cause pollution as the pollutants are related to the industrial process itself.

It is also known that in the countries with warmer climate a remarkably worse vacuum is obtained in the condenser of a condensing turbine than in Finland wherein the annual average temperature of seawater is low, about 6 to 6.5° C. In Central Europe, for example, seawater is suitable for swimming also in the coldest periods of the year, the lowest outdoor temperature being about +20° C. Of the same amount of fuel more condensing power is produced with seawater cooling in Finland than in Central Europe.

Moreover, it is known that in the community planning the sites for power plants are often selected according to the availability of cooling water, among other things. As to the siting issues, also transportation of fuel is taken into account in the centralized power maintenance. For these reasons the sites of the large power plants are often port cities. Accordingly, also the industries settle down at the same places. These facts cause that the employment is also centralised in these areas with the consequence that the development of the countryside is suffering and the countryside is depopulated. This is very disadvantageous for a sparsely populated country the significant natural resources of which, however, are located in the countryside.

The cooling of the optimally operating district heating power plant is alternative and free from previous issues related to the availability of seawater. Thus, these small power plants may be located in any district in accordance with decentralized energy production mode which gives possibilities especially for employment and development of economic life in the counryside. At the same time the trade balance of the country is improved and the indebtedness is reduced as the development of one used energy unit with indigenous fuel reduces energy import by about five units.

As the outside air is used for cooling the condenser of a turbine, the temperature of the air is varying within the range of about +25 to −30° C. The most common rating for the outside air temperature will be about −10 to 0° C., depending on the heating system solutions for the district as a whole. Then, the exhaust anergy of the turbine is processed by heat pumps to suit for the district heating system. The temperature of the steam discharging from a turbine to a condenser is about 36° C., and the amount of air is selected so that the temperature of the air coming out of a condenser before a heat pump is about +10° C. as the temperature of the outside air is −10° C., for example. Then, the air coming from a condenser may be cooled about 10° C. The outside air being warmer than this for about 7,000 hours per year, the temperature difference concerned is significantly bigger. Thus, the heat pump will be operated with a high coefficient of performance. Due to this, the heating solution is very competitive, and this is improved further by the co-operation with a power engine, a diesel engine, for example. Within the outside temperature range of +10 to −30° C. heating system and energy production system is supplemented with co-operation of production of peak-load electricity with a diesel engine and a heat pump and by applying recovery of the heat of exhaust gases of the diesel engine.

In the district wherein the need for heating is quite small in relation to the power of a small power plant, previously known cooling tower technique may be applied for cooling of the condenser of a turbine. The influence of this solution to the greenhouse effect is minimal in comparison with the influence of excessive carbon dioxide release caused by wrong energy policy as the use of electricity for heating is one-sidedly favoured and supported which increase the carbon dioxide release to six times the amount which is necessary, with the better method provided by the present invention, for example. In the climatic conditions of Finland even the cooling tower solution gives more electricity per fuel unit than the seawater cooling in Central Europe.

Because the turbine is driven with a greater annual production than a conventional district heating turbine, the annual process efficiency is improved from a value of 65 to 75% of a conventional district heating turbine to a value of 85% which is approximately the same as with an industrial back-pressure turbine. Because anergy is produced instead of heat and this anergy is processed to heat by a heat pump with a high coefficient of performance, the annual average of the fuel efficiency is even further increased.

Special Applications of the Optimally Operating District Heating Power Plant

In view of today's knowledge, the basic solution of the gas cooling system of the steam plant part of this power plant is that cooling medium is outside air and the cooling is carried out with heat exchanger technique. In the future, there may be alternative solutions because other gases exist which are able to compete with air technically and perhaps also economically. Besides this kind of cooling, also conventional cooling tower solutions may be considered, however with certain limitations, and certain alternative modifications in which limitations caused by vapourizing water for heat pump use are eliminated or reduced either by changing freezing characteristics, for example. A common advantage of all the gas cooling applications, however, are good control characteristics due to open massless system. Control characteristics provided by the peak-load power engine part of the optimally operating district heating power plant are definitely better than those of previous district heating power plants, as well as the reduction of investment costs therefore, that besides the renovations of the existing plants, also in the realization of new plants on the basis of these ideas cooling of the steam plant part with other ways, even with water, may be considered especially when some specific conditions are in favour of that.

Special Applications of the Optimally Operating District Heating Power Plant

1. Optimally operating district heating power plant, the steam plant part of which operates as a so called industrial intermediate load energy condensing power plant which provides good prerequisites for district heating activity by using heat pumps which utilize anergy from the cooling air flow of the condenser.

The obligation of treating the waste set by EU directives for the municipalities gives an opportunity to utilize combustible waste by a condensing power plant incinerating waste. This kind of plant is best justified if it is used only in wintertime for producing so called intermediate load energy during the period in which the price of electricity is the highest. Then, a plant placed in the countryside at the same time compensates unemployment because the unemployment is highest in the countryside in wintertime. The anergy of condensing power plant may then be used as an energy source of a heat pump in district heating operations. Domestic renewable fuel, like wood chips or rapeseed oil, may be used as an auxiliary or additional fuel.

2. A conventional district heating turbine is changed in such a way that it is provided with a peak-load power plant part characteristic to the optimallly operating district heating power plant, and a steam power plant part of which produces with added use of auxiliary cooler base load electricity and intermediate load energy and daily control power for requirements of industry, instead of producing electricity for space heating as is presently done. Then, the value of the auxiliary cooling heat, however is that high that it makes a small cost, about 0.015 FIM per kWh, in a plant wherein the fuel is coal or peat. If the whole capacity of the district heating turbine is in this way generated to electricity by means of auxiliary cooling, the amount of auxiliary cooling in a properly designed district heating plant is about 40% of the base load portion of the heating energy. Then, the supplementary income from the electricity is significantly larger than the extra cost of fuel caused by the auxiliary cooling. During the coldest wintertime, a further improvement may be to produce heat for the upper part of the basic heating load by a heat pump the energy source of which is the return water of the district heating grid which in this time of year often is too hot (about 60° C.). Another improvement may be to recirculate the least productive mass flows of the energy process (preheating steam of the feed water) through a small turbine to the same heating purpose as other heat produced by heat pumps, for example. The latter improvement is natural in connection of the renovation of the boiler plant.

3. An oversized district heating turbine plant is changes so that it is provided with a peak-load power plant part characteristic to the optimallly operating district heating power plant and, as means for improving the economy, with an application of low pressure condensing power plant technology, like the Boost Energy Converter equipment based on Rankine cycle of organic fluid. Then, either the district heating mass flows may be increased by converting production of district heat from the steam to production of electricity by means of a Boost Energy Converter or the district heating plant may be changed so that it will produce only base load electricity so that the low pressure chamber is replaced by a one with longer expansion suitable for condensing power production, after which the district heat is developed by heat pumps partially of the anergy of the power plant and partially of the exhaust gases of the peak-loed engine. Then, also above mentioned recirculation of the least productive mass flows throug a small turbine may be applied, in this case to the condenser of the turbine.

4. A condensing power plant is changed so that it operates in accordance with the characteristic features of the optimally operating district heating power plant and is provided with a peak-load engine of suitable size considered on the basis of the district heating demand of the local area together with utilizing the anergy of the exhaust steam of the condenser as an energy source for heat pumps. If the temperature level of the anergy leaving the condenser at a temperature of about 17 to 18° C. is raised with a heat pump back to a temperature level suitable for heating, it may be utilized. Then, also the disadvantage caused to the environment by the cooling water released to water system may be rduced or totally eliminated. The temperature level of the anergy of a power plant is always remarkably higher than any other natural anergy source available in Finland, like soil or water system. In geothermal heat pump applications the temperature of the soil is often lowered to −3° C., and with water systems as an anergy source, the temperature level drops to about +1° C. as the average coefficient of performance is equal to 2.4. In the power plant applications, as the temperature level of the anergy is the lowest with seawater cooling, the annual average temperature of the seawater being about +6.5° C. and the temperature of the exhaust steam being 18 to 20° C., the temperature of the cooling water leaving the condenser is about 15 to 17° C. Even this outflow of the anergy of the cooling water provides a chance to use a heat pump with a good coefficient of performance if the heat pump is designed to cover the base part of the heating system whereby the temperature of the circulating water is raised to about 55 to 60° C. For raising further the temperature of the circulating water the heat of the exhaust gases of the peak-load engine may be used, and further on the least productive mass flows of the energy process, e.g. preheating steam of the feed water, discarded through the renovation measures of the power plant, may be used to cover the intermediate area of the district heating demand between the base part and the peak part. In the boiler disign of today the final heat content of the exhaust gases is utilized more efficiently than earlier the consequence of which is that the preheating system for feed water, so called high pressure bled steam system, used in older power plants is no more economically justified.

FIG. 1 presents the duration curve D and the power cutting principle of the optimal rating of the district heating load wherein the peak part H of 50 percent is conventionally produced with an oil-fired boiler and the lower part of power (base part) L is produced with a district heating turbine by producing at the same time also electricity in the form of so called intermediate load energy and base-load electricity. In the optimally operating district heating power plant the base load and the peak load are produced in the way presented with reference to FIG. 12.

Figure 2:
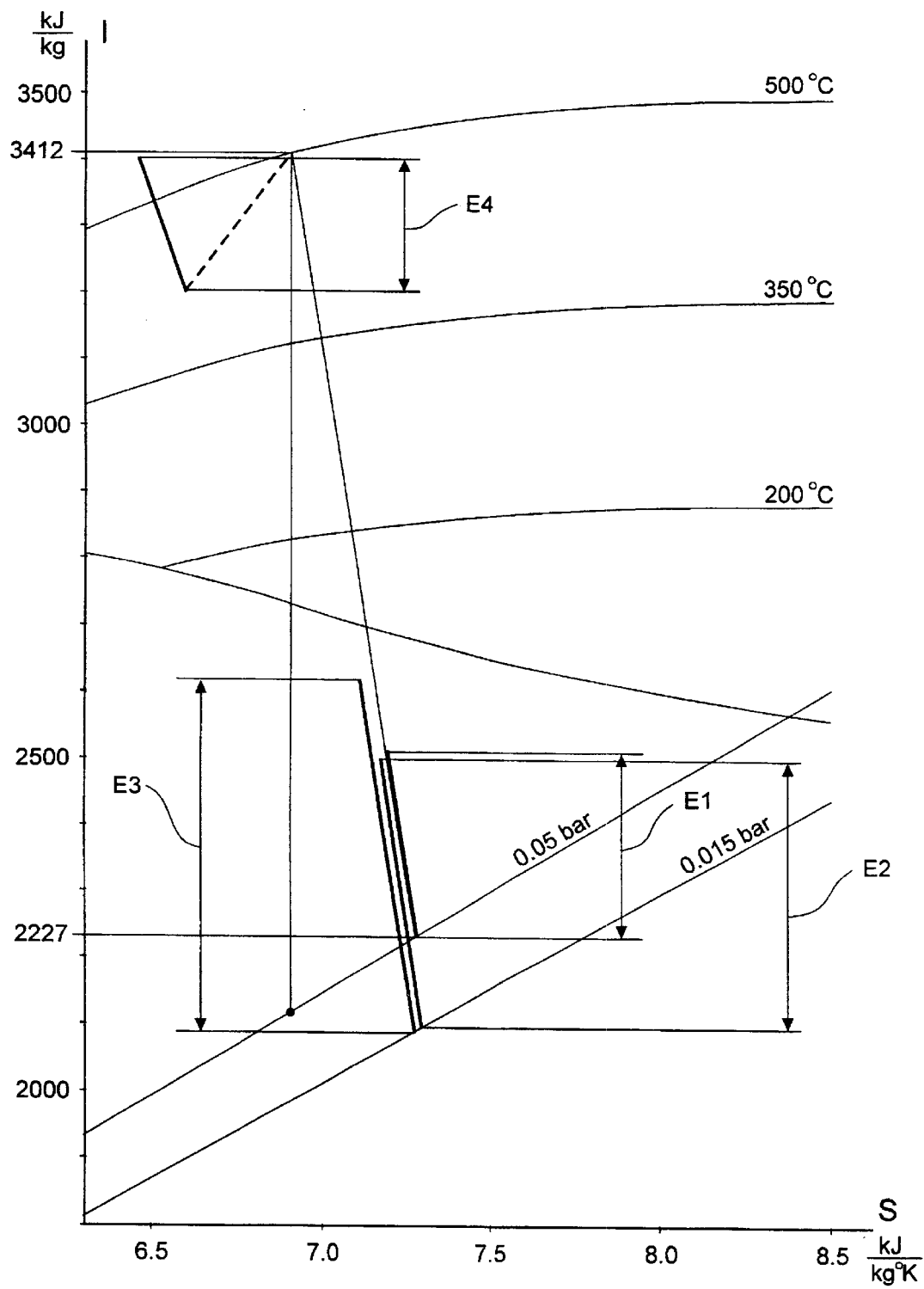

FIG. 2 presents how much more electricity the optimally operating district heating power plant produces per mass flow unit (and also per fuel unit) than a district heating power plant operating with the same parameter of steam. The arrow E1 indicates the difference at the final stage of operation as the whole district heating demand is put into effect, the arrow E2 indicates the same at the initial stage of operation as about 11% of the district heating demand is put into effect, and the arrow E3 indicates the difference during an extremely cold period as the district heating power plant operates with maximum temperature (120° C.) of the output water. The arrow E4 in the upper part of the figure indicates which additional electric power may be achieved per mass flow unit by means of intermediate superheating as the size of the power plant is increased.

Figure 3:
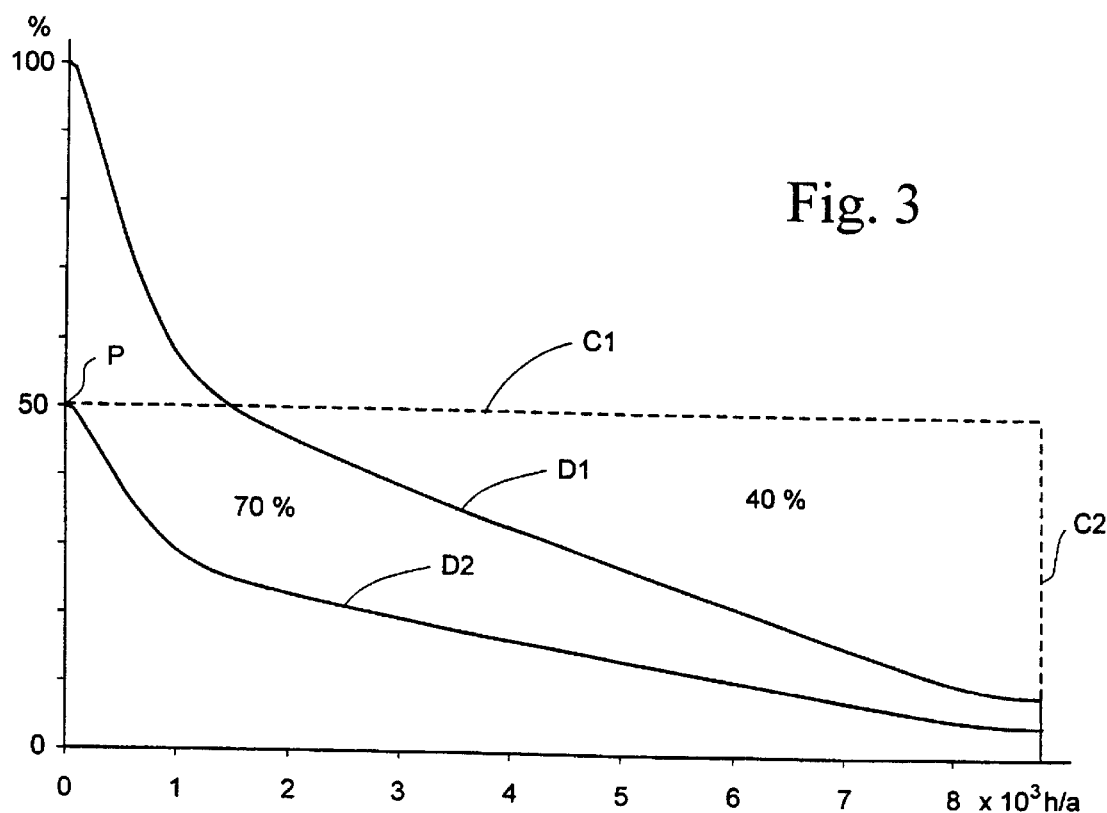

FIG. 3 presents a comparison between the methods of the optimally operating district heating power plant and U.S. Pat. No. 4,006,857. Because the latter does not present cutting of district heating power for optimizing the operation, the whole district heating power (maximum power P) must be obtained from the power of the exhaust steam of the power plant (the horizontal line C1 going through the point P). The variation of the heating demand which may be satisfied with the method is presented by so called duration curve used in the power sector to describe this variation. The area confined by the curve D2 and the co-ordinate axes describes which portion (about 30%) of the annual energy corresponding to the energy of the exhaust steam (the area confined by horizontal and vertical line C1, C2 and the co-ordinate axes) the plant is able to satisfy. Because in the optimally operating district heating power plant the district heating power is cut at the point of about 50% for optimizing the economy of the operation and the upper part of the district heating power is produced mainly with the exhaust gas heat of the peak-load engine, the district heating operation which may be carried out with this plant complies with the duration curve D1. As may be seen, this curve confines about 60% of the area of the rectangular which means that by this method the amount of the anergy of the exhaust steam of the power plant which may be utilized is about double the amount of the competing method. Because about 70% of the anergy of the exhaust steam remains useless, the power plant must be provided with a separate auxiliary cooling system for conducting the anergy away and for producing the same amount of electricity of the same amount of fuel than with the optimally operating district heating power plant. Otherwise, the electricity generation is remarkably less that 30% of the electricity generation of the optimally operating district heating power plant.

Figure 4:
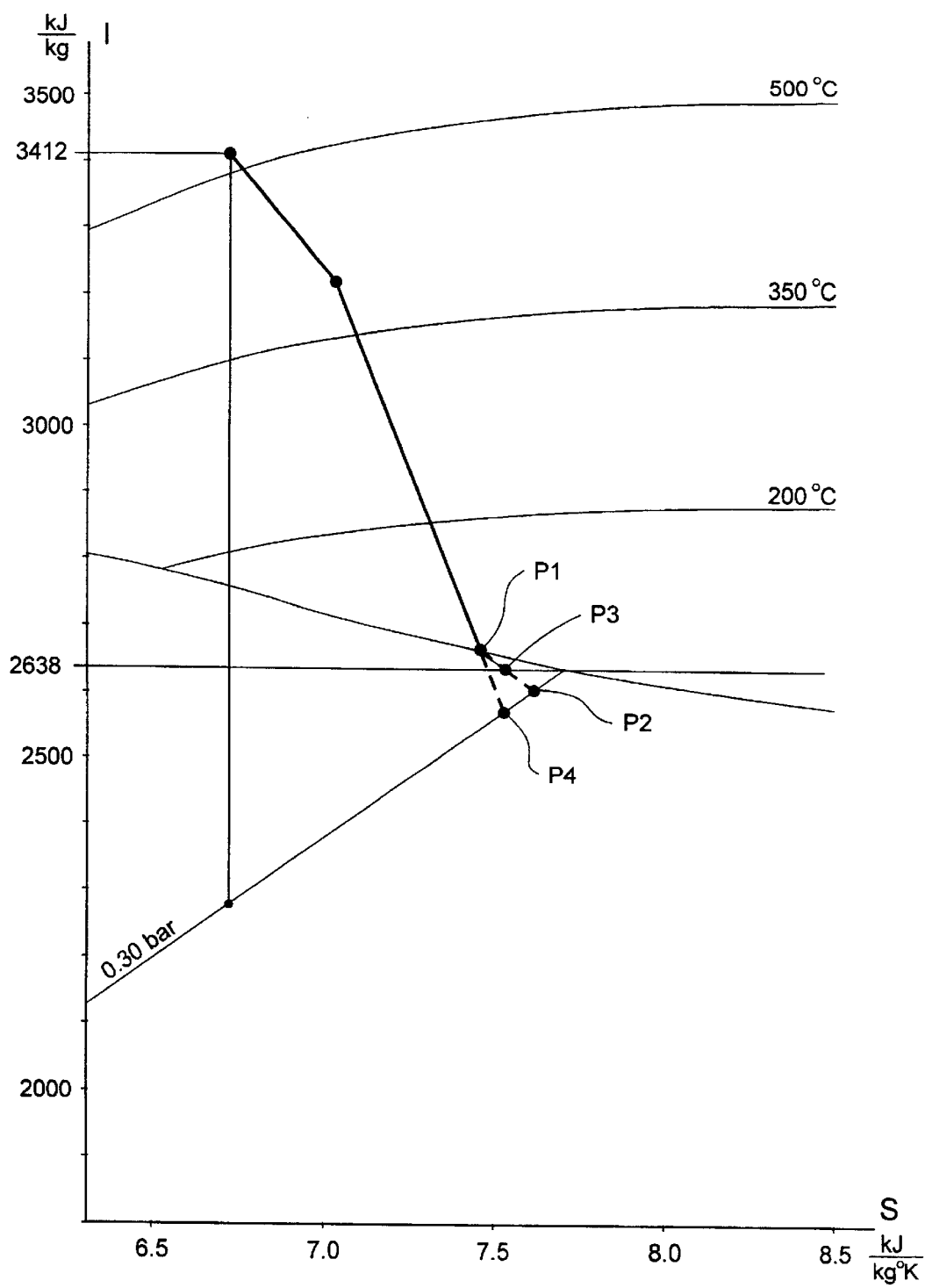
FIGS. 4 to 9 are IS plot presentations related to various embodiments of the invention.

FIG. 4 presents, by means of an expansion curve drawn on an IS plot, a situation in which an oversized district heating turbine must be driven with a partial load in wintertime. The upper less steep part of the curve describes the operation of a partially admitted regulation wheel. Normally, the steam is expanded to the point P4 but for oversizing the expansion extends to point P2. In a normal case, the district heat is produced at two stages (with two heat-exchangers) whereby the heating at the first stage is carried out by steam taken from the end of the expansion (P2), and the heating at the second stage is carried out by a tapping of the turbine (P1). These steam mass flows are normally approximately equal. Calculation of the electricity given by the turbine may then be simpified by assuming that the whole district heating mass flow is taken from point P3 the enthalpy of which is the average of points P1 and P2. By such a calculation, it may be seen that that the turbine concerned gives (815–630)/860·0.98=0.211 units electricity of one mass flow unit.

Figure 5:
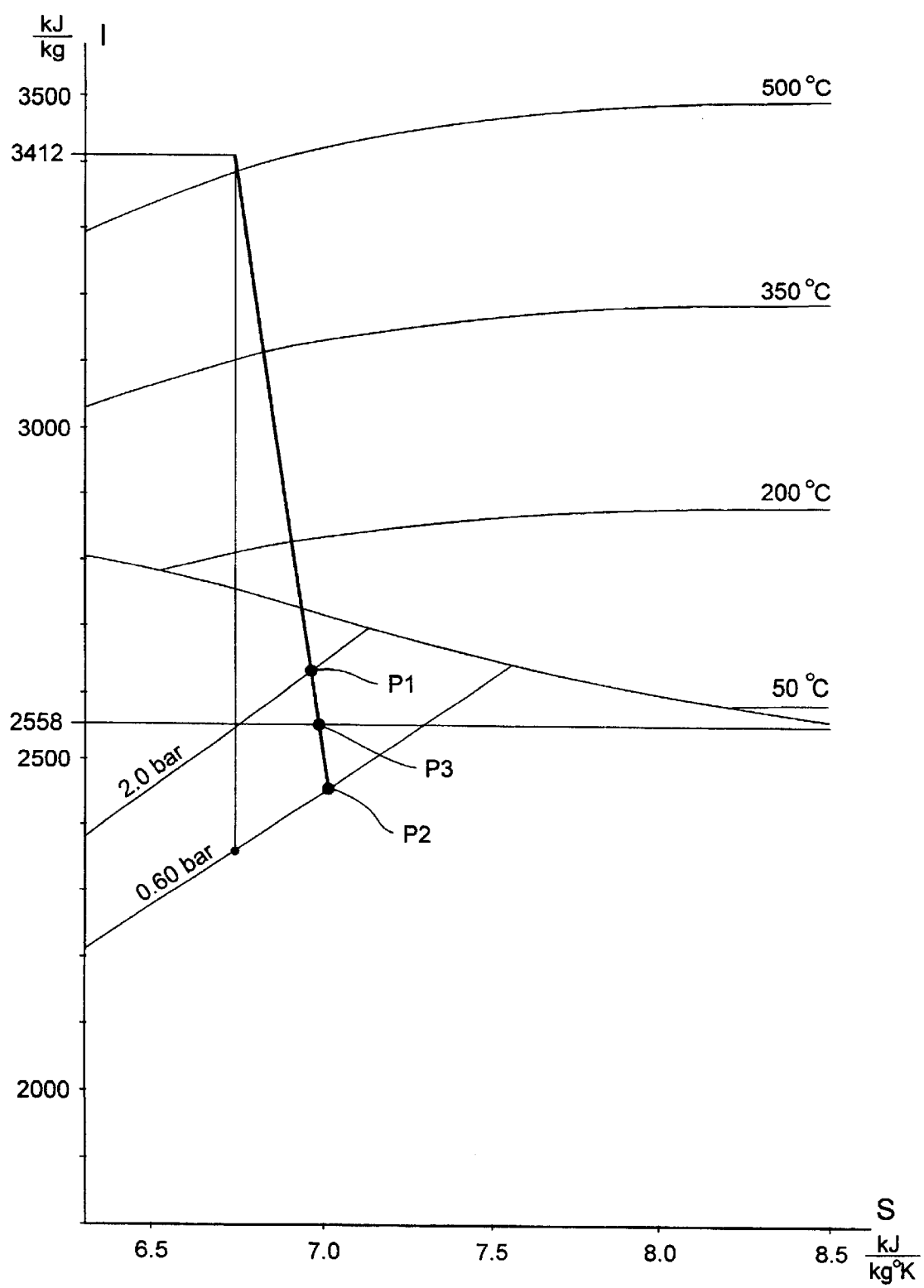

FIG. 5 indicates how a properly designed district heating turbine is driven with full power in wintertime, but the driving scheme is wrong. The exhaust steam comes out from the turbine at a temperature of 120° C., althoug it would be better to take it out at a temperature of 90° C. and raise the temperature of outgoing water from 90° C. to 120° C. by means of a boiler, for example. By the above calculation, the turbine concerned produces (815–611)/860·0,98=0.232 units electricity.

Figure 6:
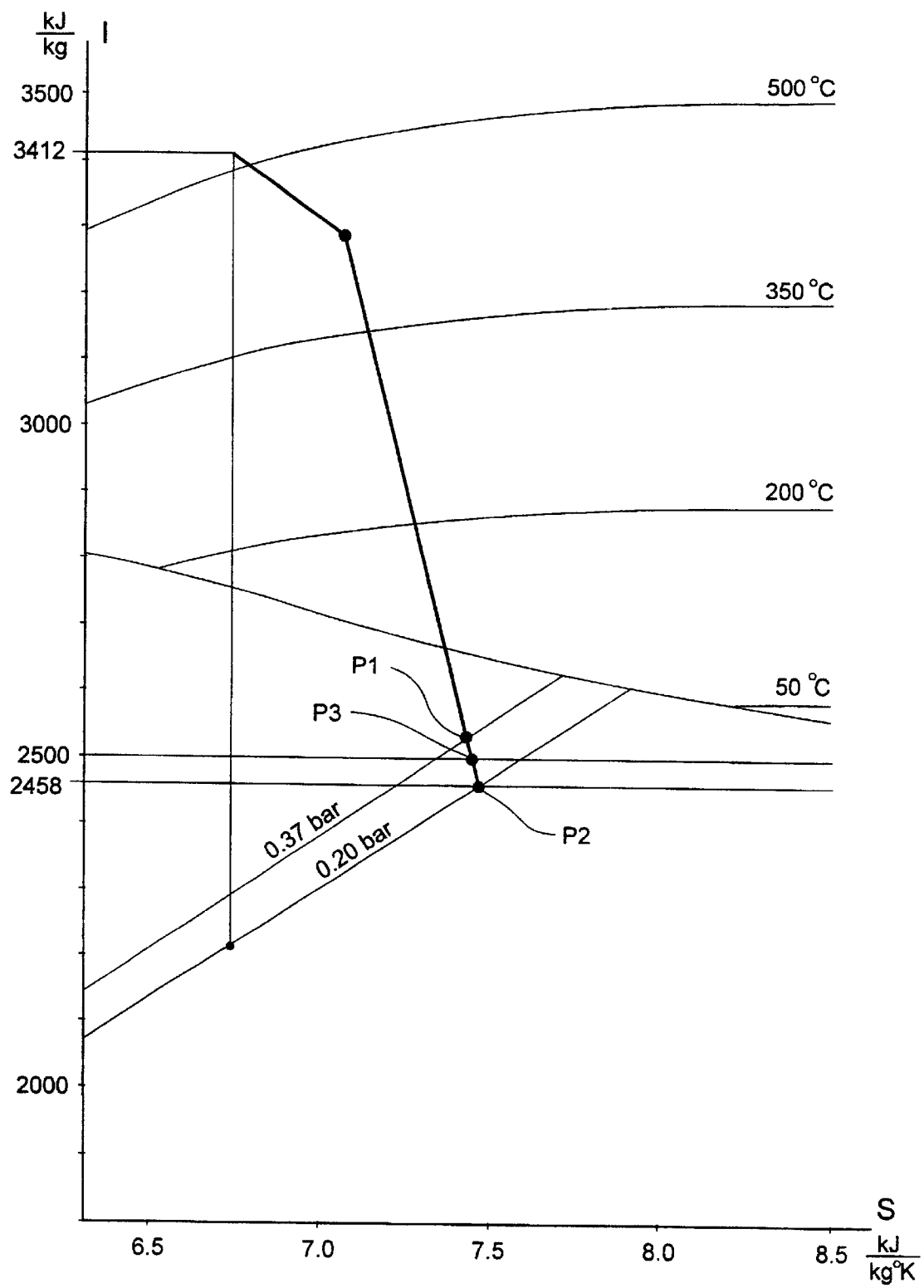

FIG. 6 indicates how a properly designed district heating turbine is driven with partial power in summertime whereby the temperature of the district heating water is raised to 70° C. The heating is now at one stage by steam taken from the end of the expansion (P2). The turbine concerned produces (815–587)/860·0,98=2.60 units electricity.

Figure 7:
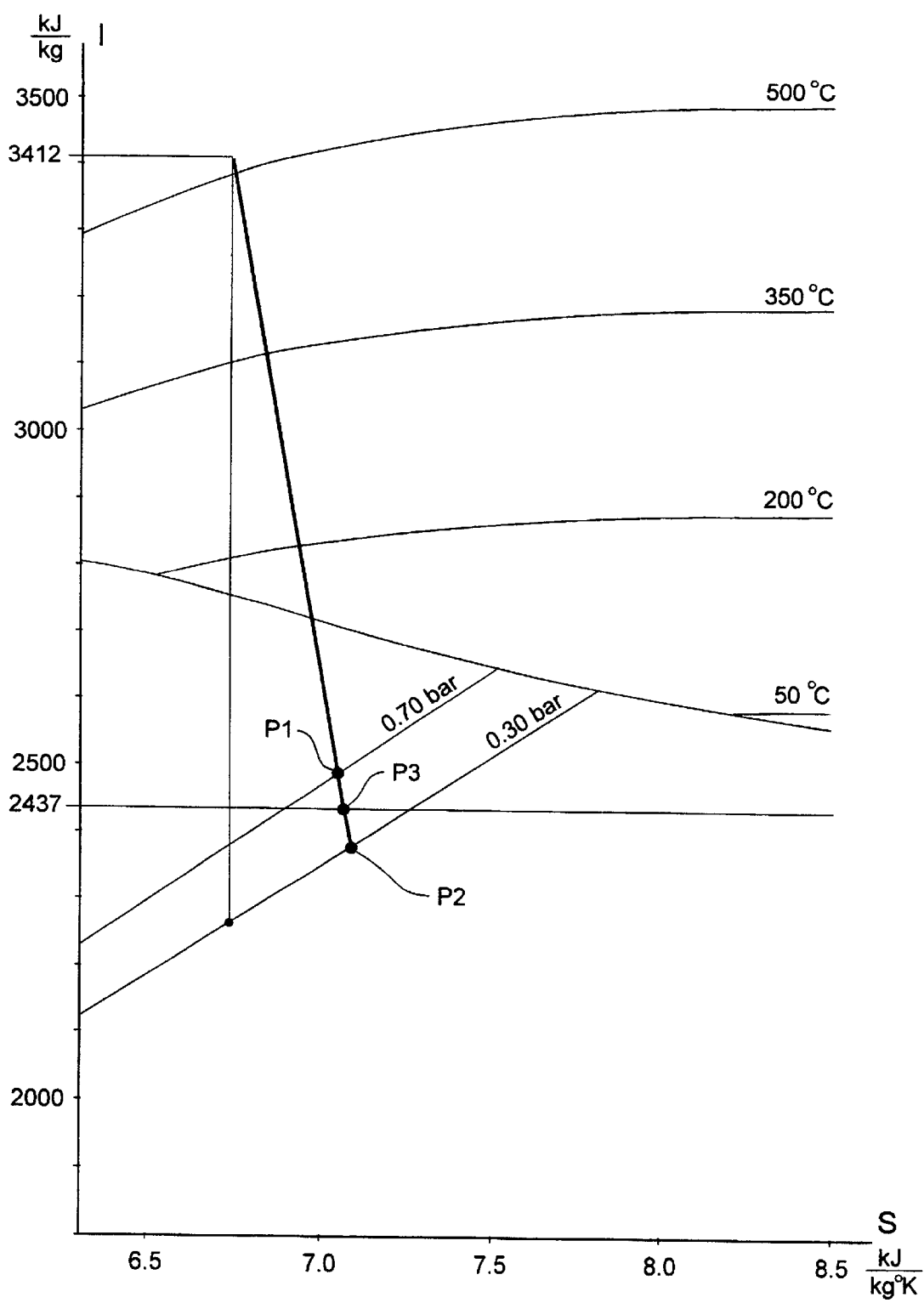

FIG. 7 indicates how a properly designed district heating turbine is driven with a wintertime load in a right way whereby the temperature of the exhaust steam of the turbine is 90° C. It may be seen that the turbine gives (815–582)/860·0,98=2.66 units electricity.

Figure 8:
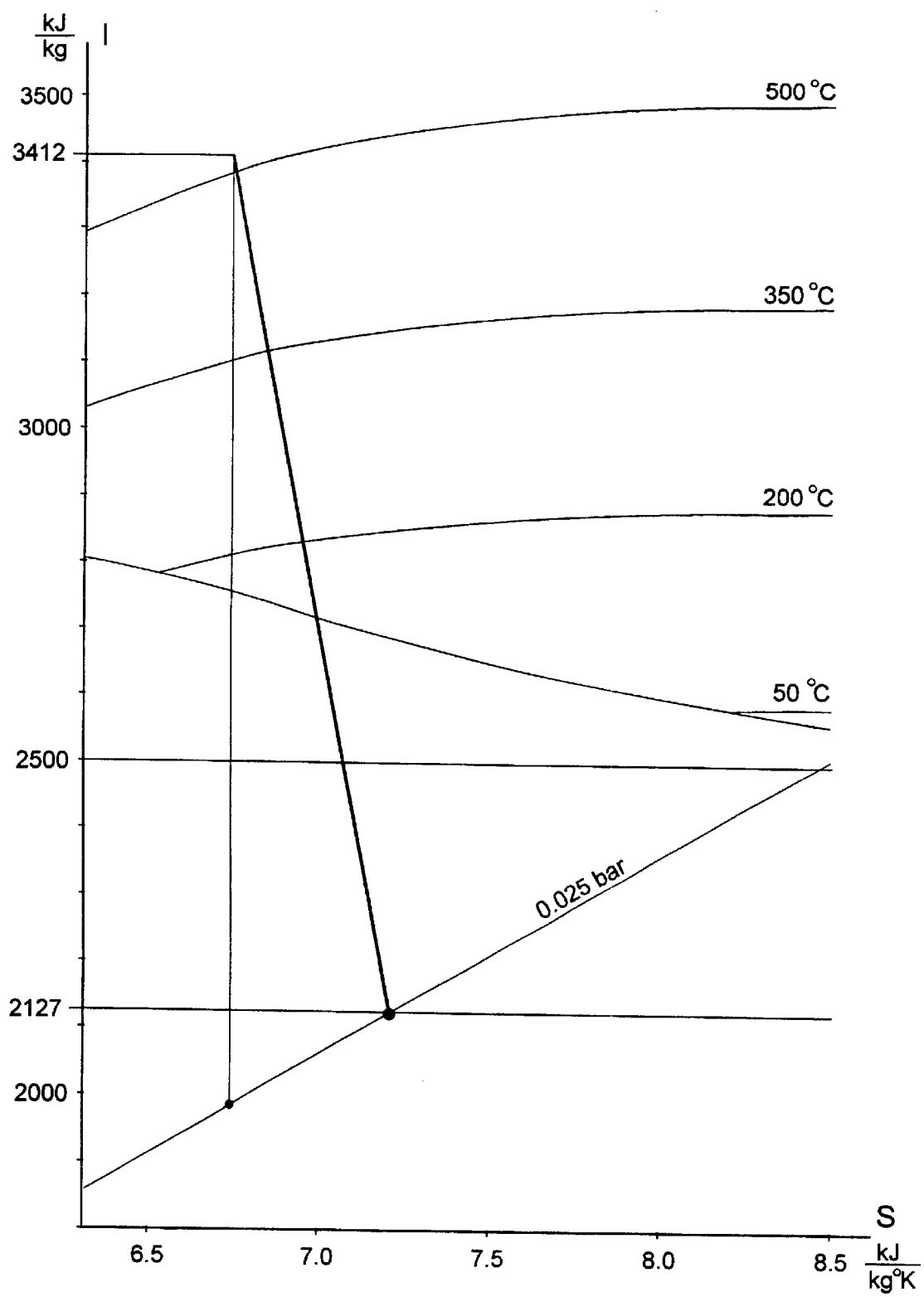

FIG. 8 presents an expansion curve of a conventional condensing power plant with seawater cooling in the conditions of Finland. It may be seen that the expansion curve is longer than the curves of FIGS. 4 to 7. The conventional condensing power plant gives (815–508)/860·0,98=3.50 units electricity but not at all heat.

Figure 9:
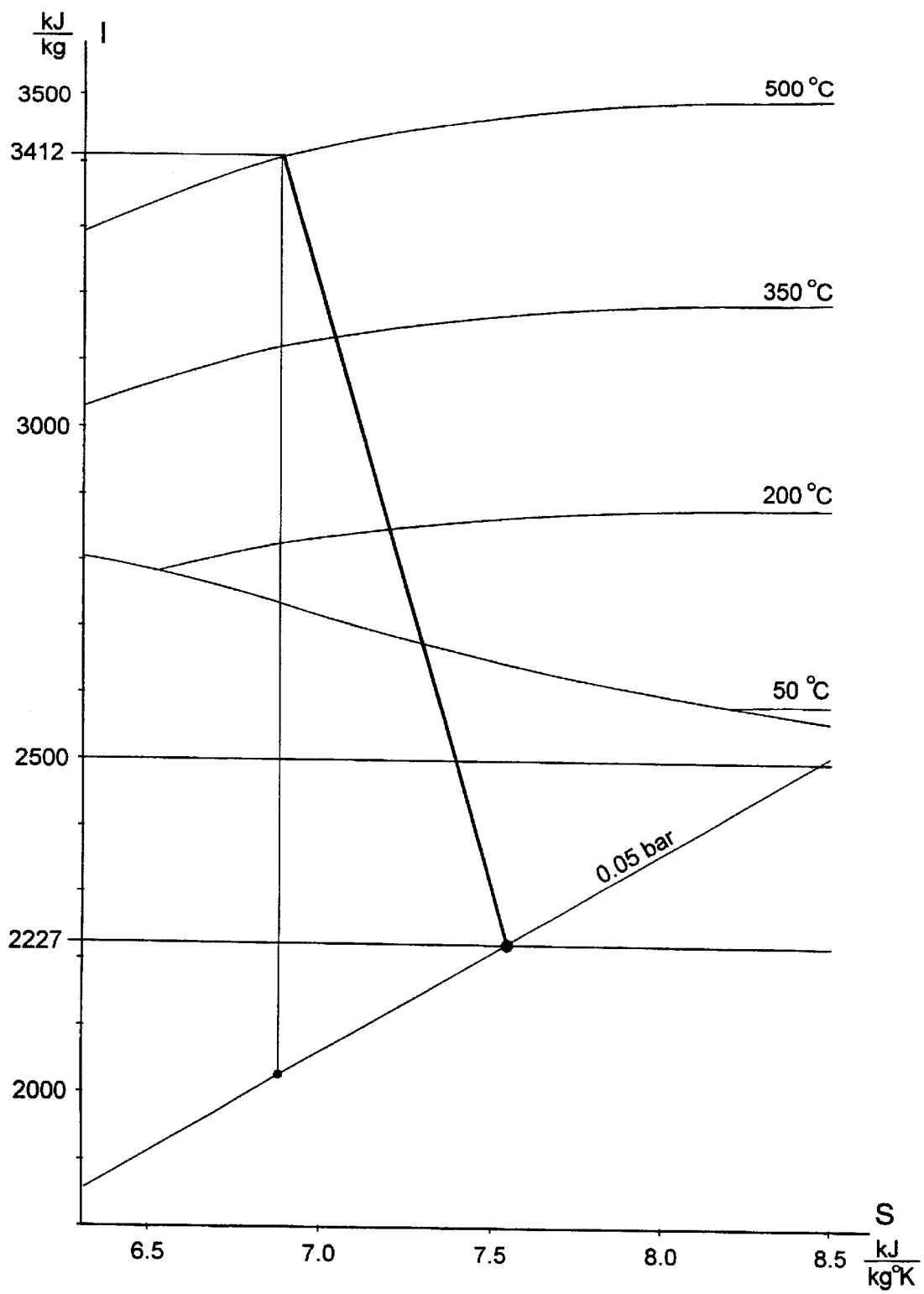

FIG. 9 presents the way in which the optimally operating district heating power plant according to the invention is designed. It may be seen that with a small power plant in accordance with the invention, with the steam conditions: 60 bar, 510° C, and the isentropic efficiency of 90%, (815–532)/860·0,98=3.22 units electricity is obtained, i.e. almost the same amount as with a condensing power plant. At the early stage of operation, the district heating power being only 11% of the final power, about (815–490)/860·0,98= 3.70 units electricity, i.e. more than with a condensing power plant (see above: 0.350 units), may be produced per one fuel unit with an air cooling solution due to low temperature of the air and a better vacuum than with a condensing turbine with seawater cooling.

Figure 10:
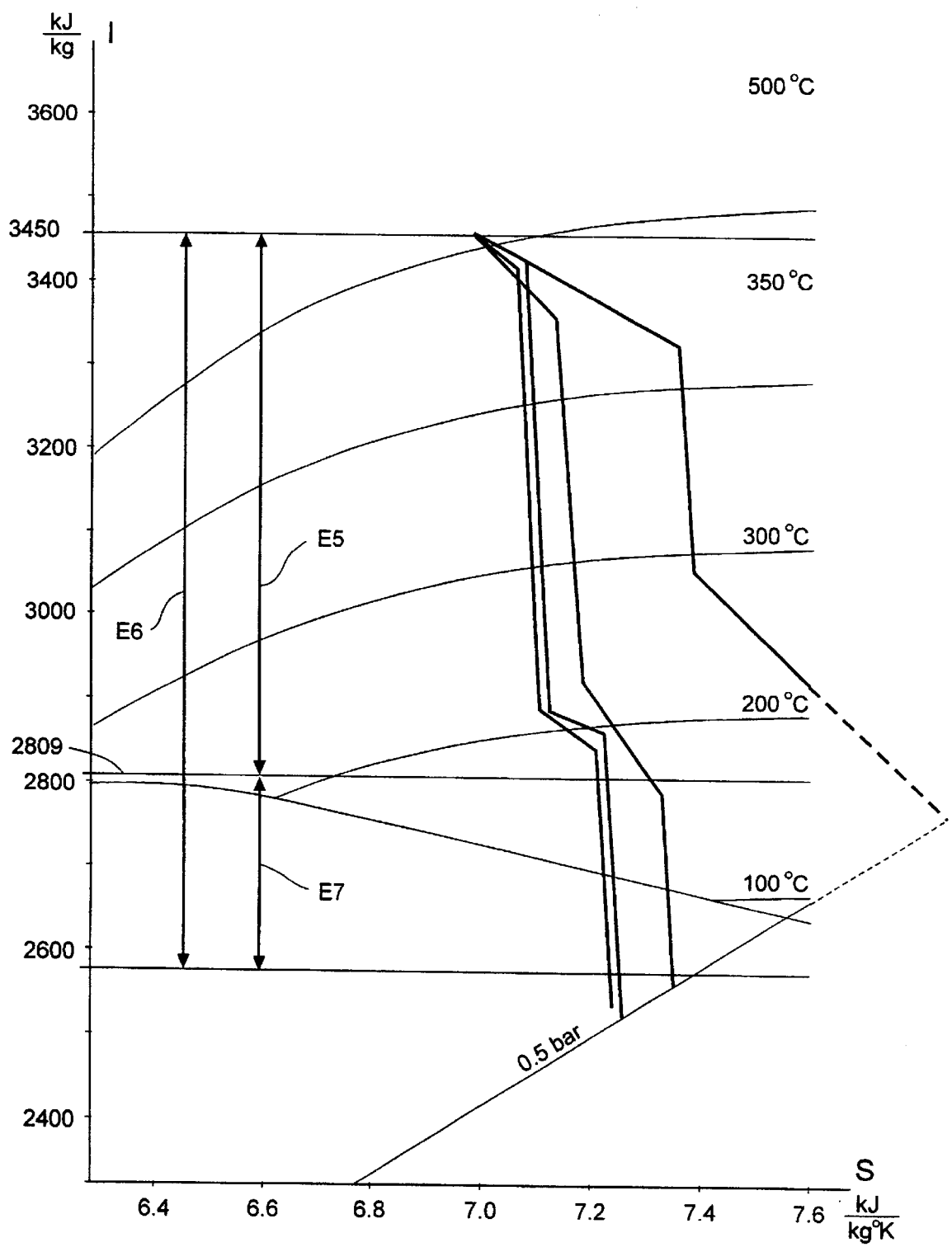
FIGS. 10 and 11 are, respectively, a IS plot presentation and a duration curve presentation related to an example of amending an existing power plant in accordance with the principles of the invention.

FIG. 10 presents the expansion curves taken from the acceptance inspection protocol of the back-pressure heat district turbine of stage III of the Kokkola power plant owned by Imatran Voima Oy. The arrow E5 indicates the present annual average of electricity generation, the arrow E6 the proposed proposed generation of 52 MW, and the arrow E7 the efficiency amendment achieved by the changes proposed in this specification for an oversized district heating turbine plant. The acceptance inspection was carried out with artificial heating loads because of the oversizing of the turbine plant. The lowest guarantee point was selected in view of the summertime power levels for which it could be driven under real operating conditions (the first curve from the right). The summertime expansion curve came to prove the quality, also the wintertime quality, of the turbine for the whole future thereof. Today, at the turn of the year 1998/ 1999, this practically idle running turbine, the designed power of which is 52 MW and the maximum power with which it is run during 19 years being 40 MW, is running with the electric power of 10 MW, the same as the starting level in 1978, as the city of Kokkola has, for too high a price, denounced the treaty of buying heat from the plant.

Figure 11:
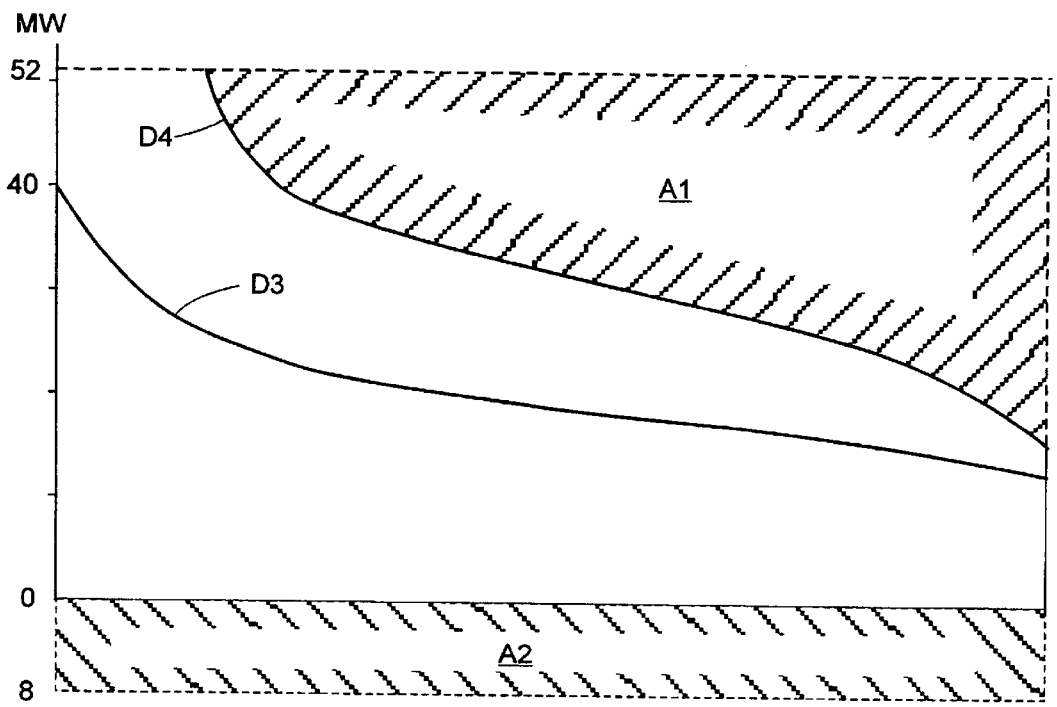

In FIG. 11, the curve D3 presents the operation level achieved by the above stage III turbine in 1997, 18 years after the start-up. The curve D4 indicates a proper design. The area A1 corresponds to the auxiliary cooling power, and the area A2 corresponds to a supplementary electricity generation achievable by a Boost Energy Converter or equivalent.

Figure 12:
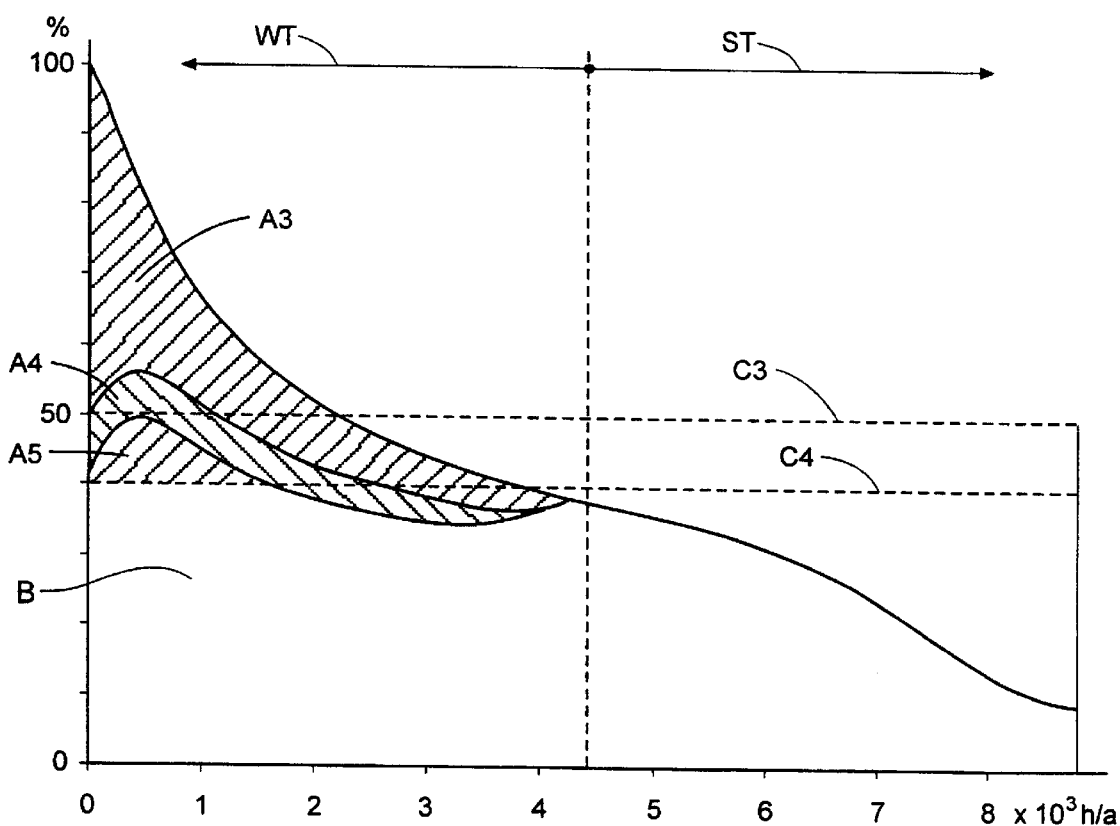
FIG. 12 is a schematic duration curve presentation of the method of the invention.

FIG. 12 presents the principle of heat production of the optimally operating district heating power plant. The upper hatched area A3 indicates the heat originated from the exhaust gases of the peak-load engine. The lower hatched area A4 indicates the heat obtainable from the exhaust gases of a driving engine of a heat pump of a period of a higher electricity tariff of wintertime, and the areas without hatching indicate heat originating from the anergy of the of the steam power plant part. The arrow WT indicates the time of winter tariffs and the arrow ST the time of summer tariffs. The line C3 indicates the normal optimal design power of the exhaust steam of the steam power plant part and the line C4 indicates lowering effect of the sensitivity analysis of the investments to the optimal design power. In the optimally operating district heating power plant, the base load B of the heating demand is produced by heat pump technology of the anergy of a turbine with a longer expansion operating like a condensing turbine instead of a conventional district heating turbine, the turbine producing mainly base load electricity and regulating power. The peak-load power A3, A4, A5 is produced partially with heat pumps of the same anergy of the exhaust steam and partially of the exhaust gas heat of a peak-load engine producing mainly peak-load electricity and wintertime regulating power. Moreover, a part the wintertime heating demand is produced of the exhaust gas heat of a possible disel driven heat pump. The portion of the exhaust gas heat varies from year to year mainly for outdoor temperatures and lasting of temperature periods which affect the peak load demand and so the driving times of the peakload engines. In a cold winter, the portion of the exhaust gas heat is larger than in a mild winter. Because the cold days are not always in succession but there may be mild days therebetween, by storage containers of a buffer system may be achieved a situation that by discharging heat from the storage containers in cold days the utilization power of the anergy may be above the power of the anergy C4 of the steam power plant corresponding to the portion A5 of the anergy. As the power plant concerned starts the operation with a small part (about 11%) of the final district heating demand, the investments to the district heating side tolerate well that the operation in regard to the heat pump power is secured with an extra electrically driven backup pump unit whereby a possibility to competitive bidding of driving power for heat pumps is provided. Accordingly, the area of the lower hatched area A4 may vary depending on the competition conditions. If the upper area of the base load of the district heating demand, without the exhaust gas heat, is produced with an elctrically driven backup heat pump, the plant utilizes a little greater part of the free anergy of the exhaust steam.

As the optimally operating district heating power plant is a small-scale plant, by a good integrated community planning also such applications may be found in which the utilization of fuel, in comparison with the high-power stations, causes significantly smaller release of carbon dioxide or no release at all. This is achieved if the power plant is placed adjacent to an industrial area where also industries with high demand of cooling, like a slaughterhouse or an ice-cream factory or equivalent, may be placed. Then, the cooling with conventional electric refrigeration machines may be raplaced by carbon dioxide cooling as the exhaust gases of the boiler are cooled to so low a temperature that carbon dioxide is liquefied. Thus, by means of the anergy removed by the cooling also the temperature level of the combustion air of the boiler may be raised by heat pumps. Liquid pressurized carbon dioxide may be transferred by a pump to refrigerating machines of a slaughterhouse, for example. As the use of carbon dioxide for cooling replaces cooling with electricity, the total release of carbon dioxide is reduced even though the carbon dioxide after cooling is released to the atmosphere. If there is a river available in the vicinity to which the carbon dioxide may be conducted from the cooling point where it is released to final pressure thereof and gasified again, the release of carbon dioxide to the atmosphere is further reduced due to formation of carbonates in water. However, the influence of these solutions are so small that it does not justify the use of carbon dioxide cooling applications.

At locations where industries with cooling demands can not be provided, it is possible to cool the carbon dioxide gas to so low a temperature that it is transformed to cardonddioxide ice which may be marketed as a useful product for general needs of refrigerated transport. Then, the production of ice together with eletricity replaces partially the separate production of carbon dioxide ice for cooling purposes in other places. In regard to the generation of electricity the reduction of the release of carbon dioxide is total as far as such a production of carbon-dioxide ice replaces separate production of said ice. Carbon-dioxide ice is used also for other purposes than the refrigerated transport. A special application may be also to gather returned spoiled batches of lime of which calcium lye may be manufactured. The carbon dioxide in the exhaust gas of the power plant may be bound to the calcium lye and thereby produce limestone which may be used again for production of lime. By this kind of operations the problem of greenhouse effect due to carbondioxide release may be alleviated and spread the negative influence to a longer period whereby the plants have a better opportunity to make use of the release. At the same time the sufficiency of limestone is improved which is advantageous for the future generations. Today, a part of the produced lime is wasted because of spoiling. If the recycling of limestone is not appreciated, it may be used also as a local filling material whereby no harm for the environment is caused. It would be a good base material for landscaping. This kind of activities are not possible in connection with the high-power plants because the local releases were too large. Also other lyes could be used for absorbing the carbon dioxide component of the combustion gases of a small-scale power plant. Thus, a small-scale power plant provides a subject for research of the utilization of local waste and byproducts of industry in our struggle against the greenhouse effect. There is hardly any comprehensive solution to this problem, and so all the partial solutions amending the situation should be found. In this way, no remarkable further financial encumbrances are set to this generation, either.

Due to a preferred small size of the optimally operating district heating power plant of the invention, it is advantageous to design and acquire the steam power plant part by using modules of certain size, preferably two or three suitable sizes. Some examples of rating the plant and combining the modules for obtaining a desired steam plant power are presented in FIGS. 13 to 18. Then, the most expensive part of the power plants could be produced in series, and the production could be automated, too, which would lower the investment costs. Also, the rating, quality, and performance of the steam plant part would be assured, as the modules would be standard products the functionality and reliability of which could be assured.

Figure 13:
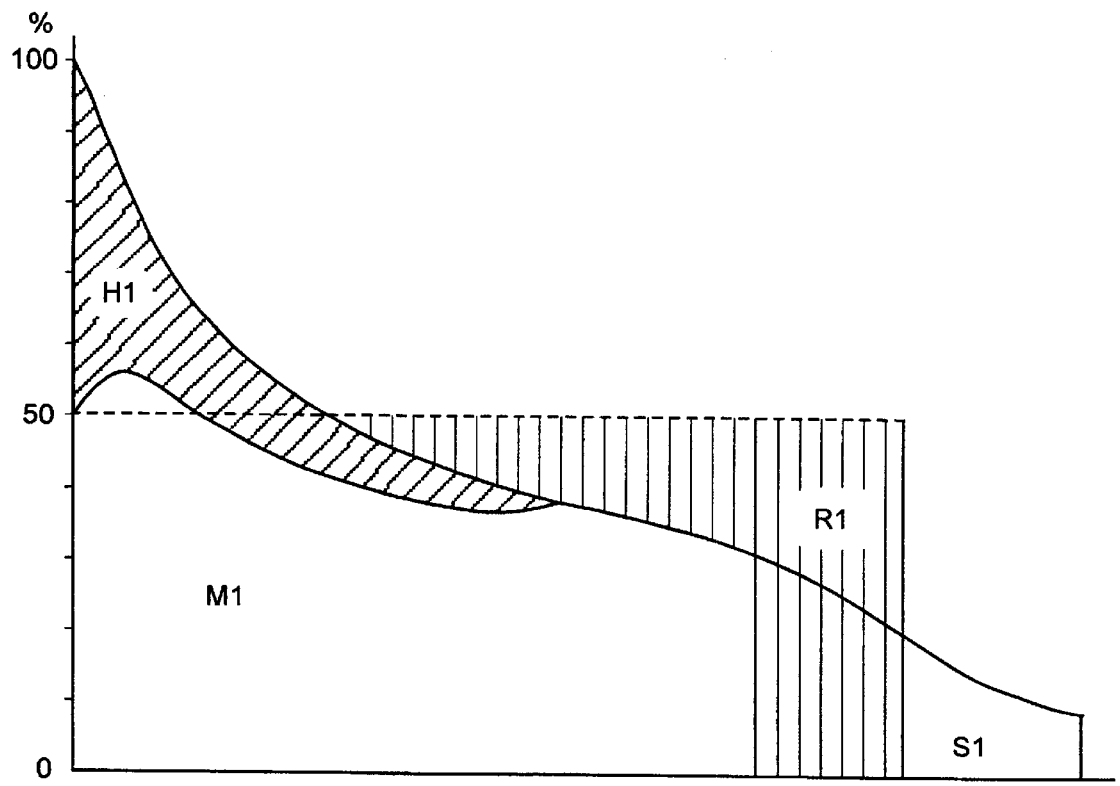
FIGS. 13 to 18 are schematic duration curve presentations of alternative embodiments of rating and modular realization of the power plant according to the invention.
Figure 14:
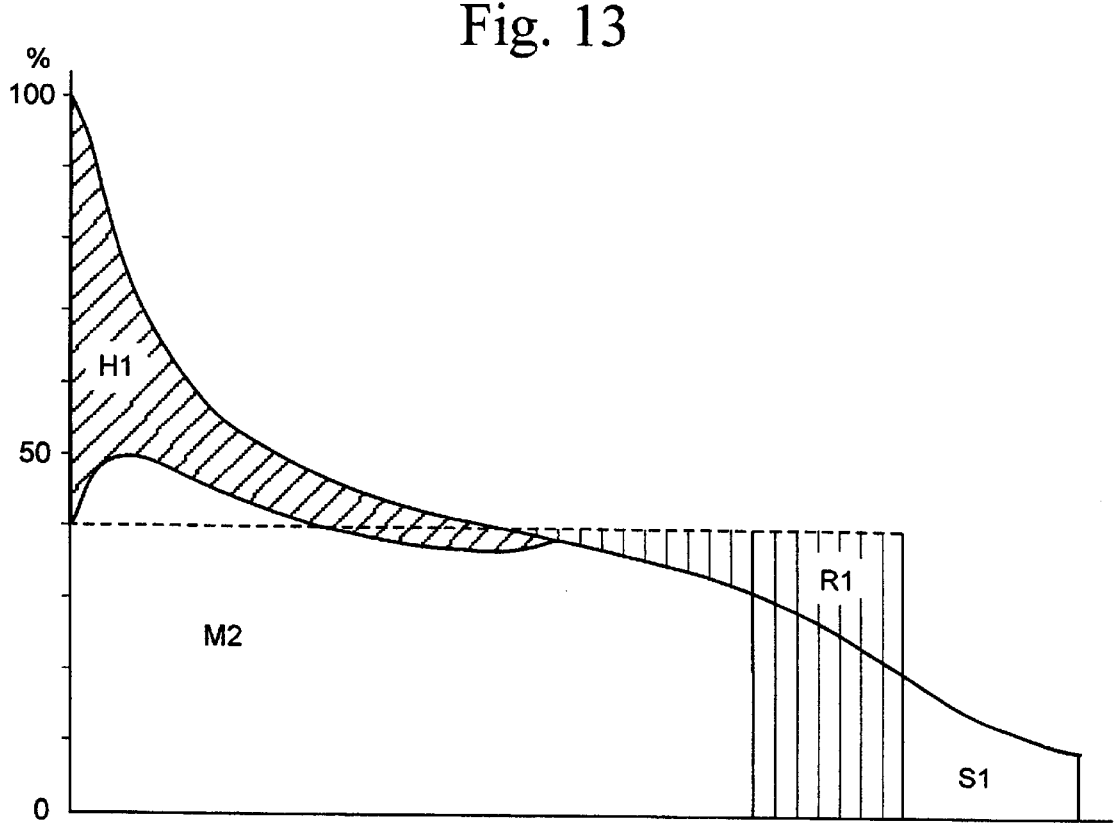

FIGS. 13 and 14 present one module solutions. In FIG. 13, a bigger module M1 is selected for coverage of 50 percent of the district heating power range. In FIG. 14, a smaller module M2 is selected for coverage of only about 40 percent of the district heating power range. Accordingly, the power of the peak-load engine must be higher in the solution of FIG. 14 than in the solution of FIG. 13, for covering the peak part H1 of the district heating power range. However, the excessive investment cost for a more powerful peak-load engine in FIG. 14 is quite small in relation to the reduction of investment costs for a smaller steam plant module. The overcapacity R1 is bigger in FIG. 13 than in FIG. 14 which means that more regulation is needed in the solution of FIG. 13. In summertime it would be advantageous to purchase the needed power, which portion is shown by S1.

Figure 15:
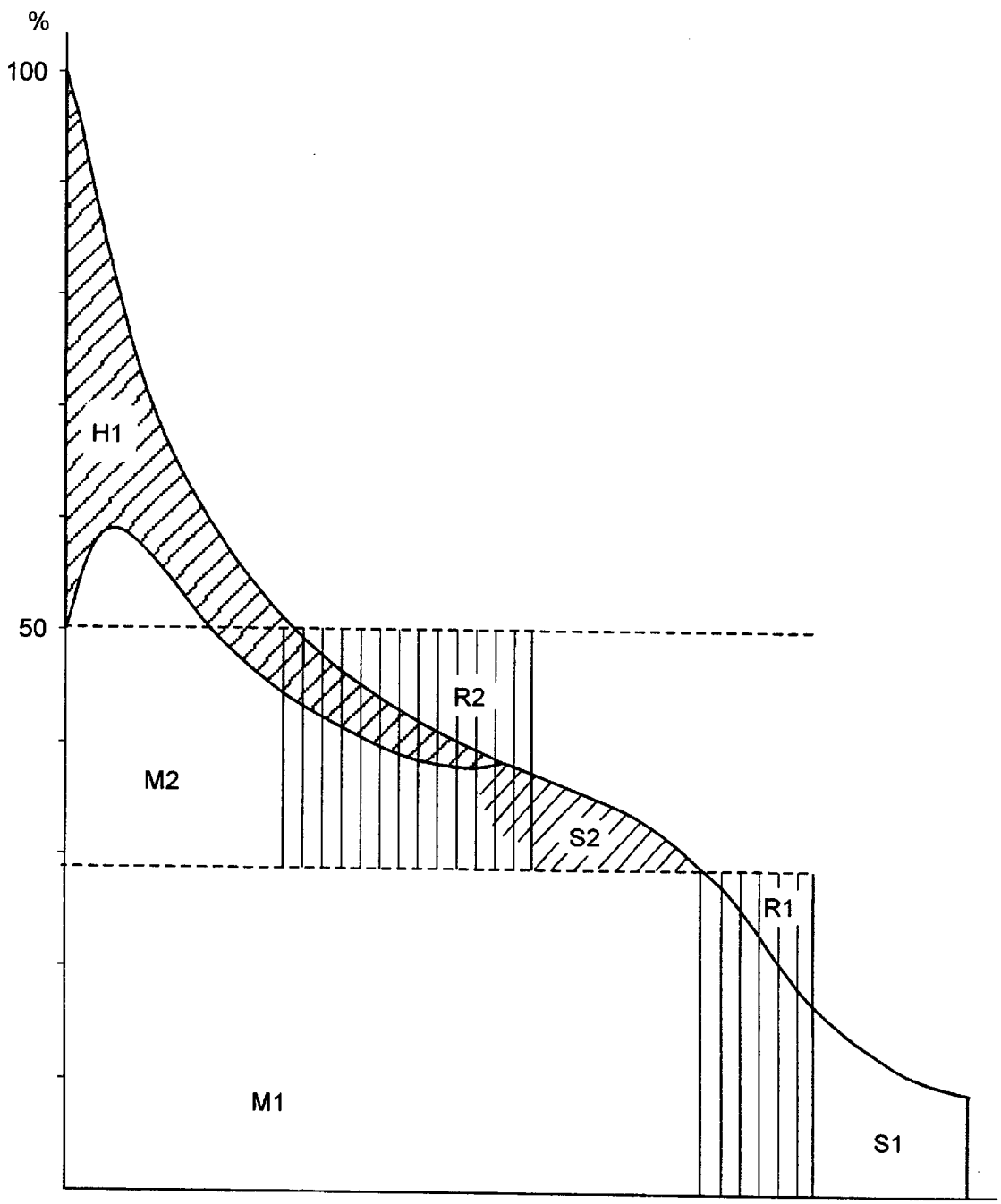
Figure 16:
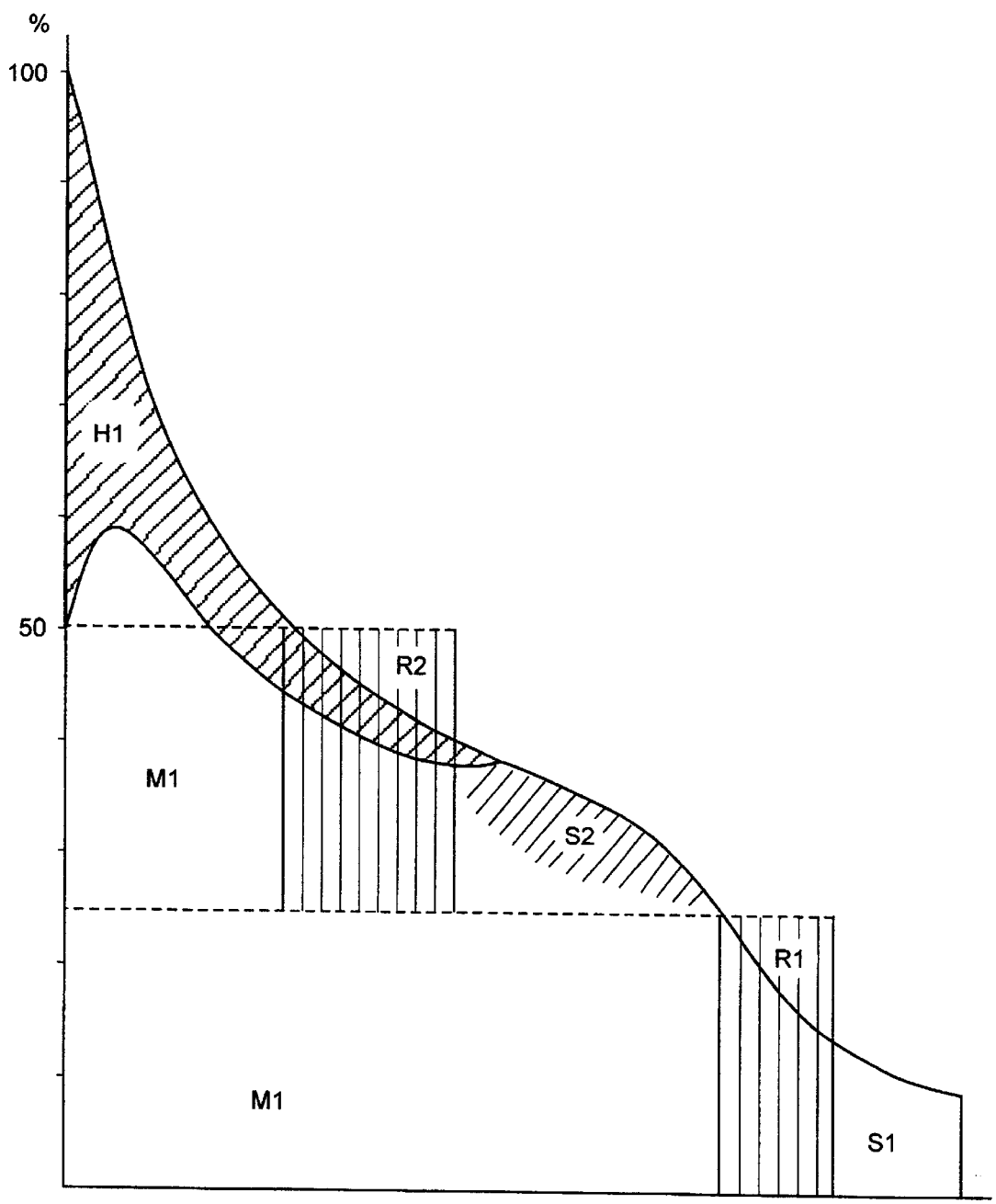

FIG. 15 present a solution with one bigger module M1 and one smaller module M2, and FIG. 16 a sorresponding solution with two bigger modules M1. The reference sign S2 indicates the need of supplementary power needed in autumn before starting and, respectively, in spring after downdriving the upper module M2, M1, respectively. This portion may be purchased or produced with the peak-load engine. The reference sign R2 indicates the overcapacity (need for regulation) of the upper module. As the upper module M2 or M1, respectively, are driven in the area of intermediate load, in which the price of the electricity is higher than in the area of base load, also competition bidding for fuels available within a reasonable transport distance and somewhat more expensive than the fuel used for base load power generation may be arranged. In addition to coal, such fuels as brown coal, milled peat, or dried municipal waste could be considered for the lower module. For the upper module also wood chips, by-products of forest industries, construction wood waste, or combustible waste could be taken into account.

Figure 17:
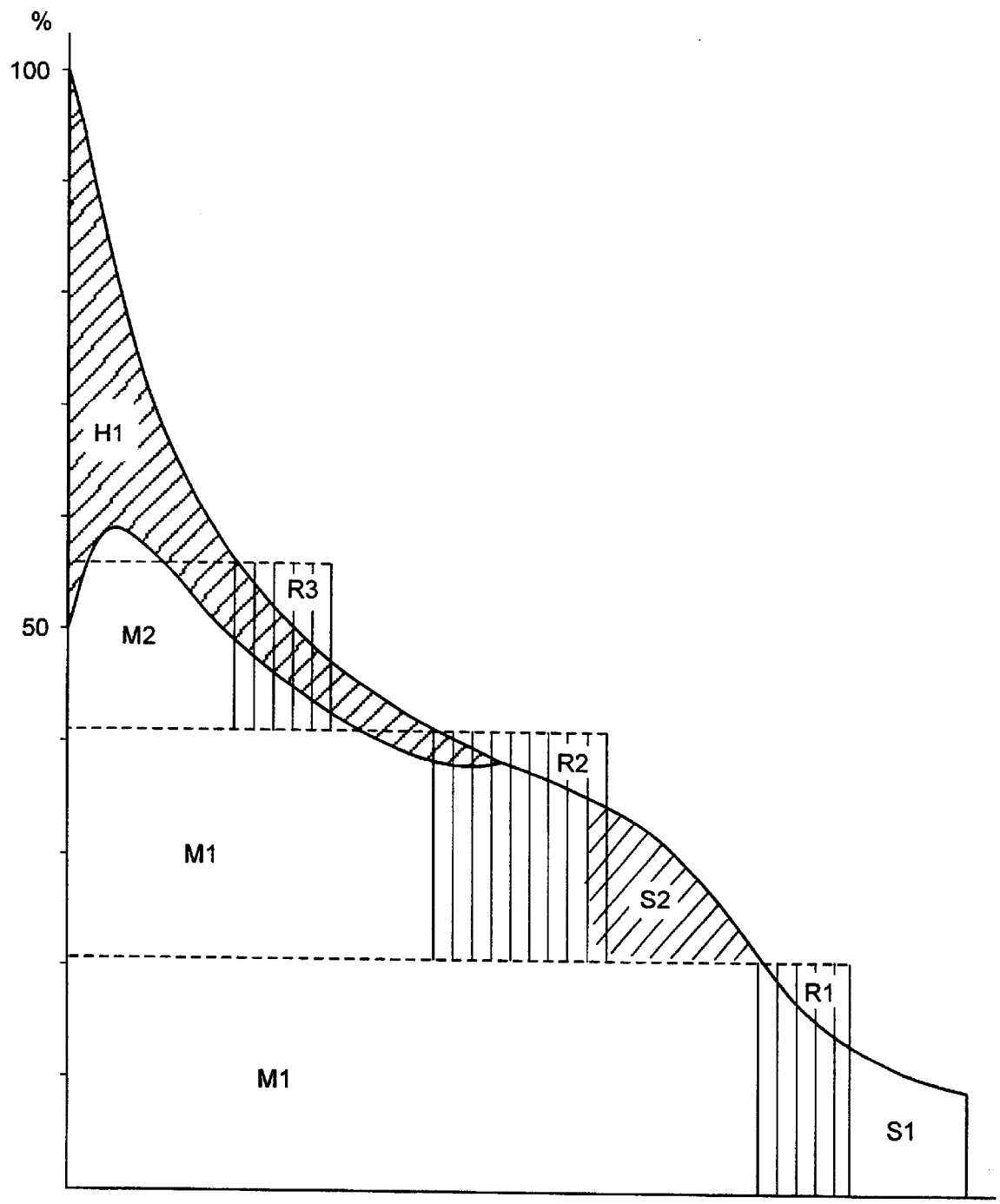
Figure 18:
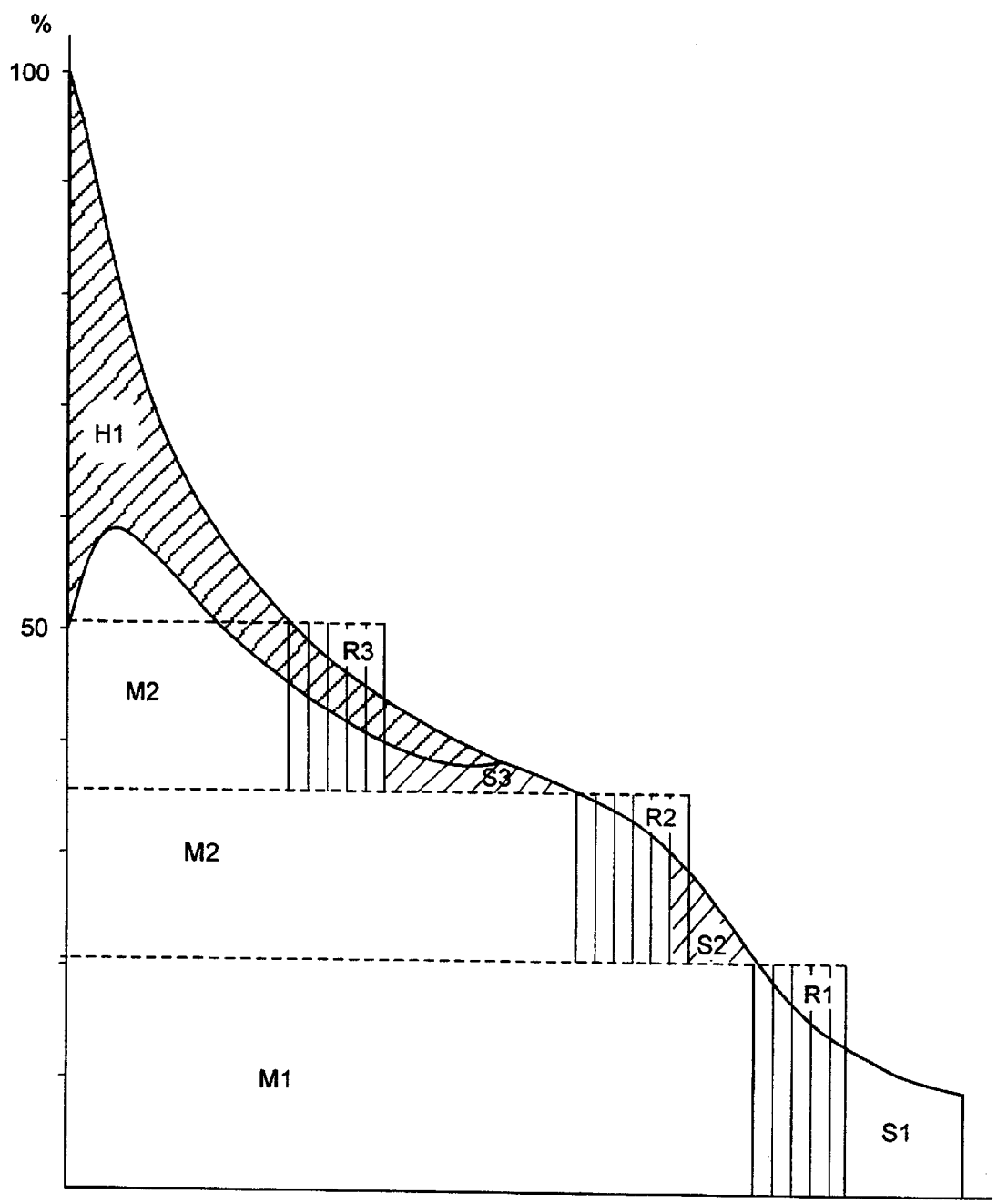
Figure 19:
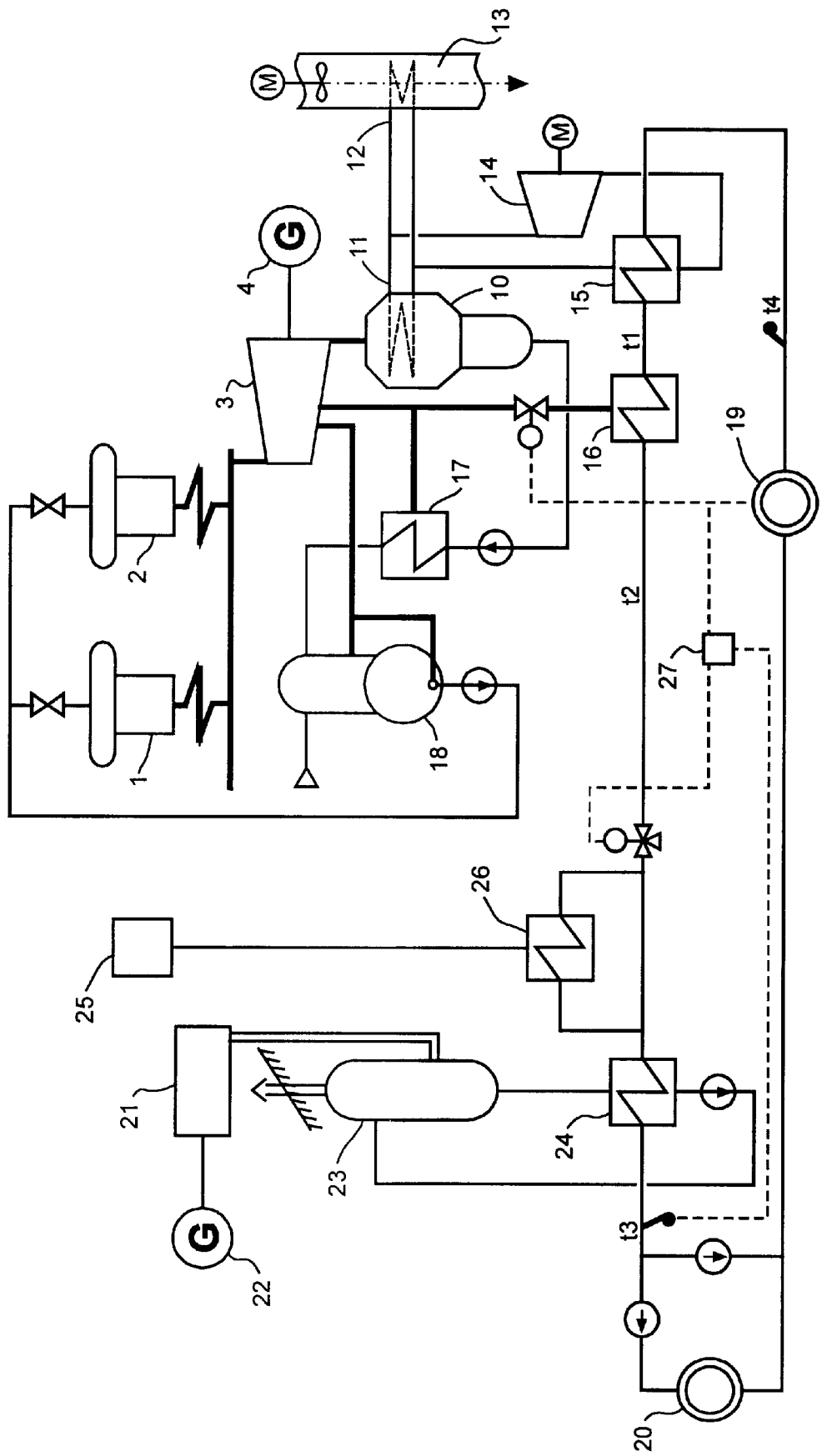
Figure 20:
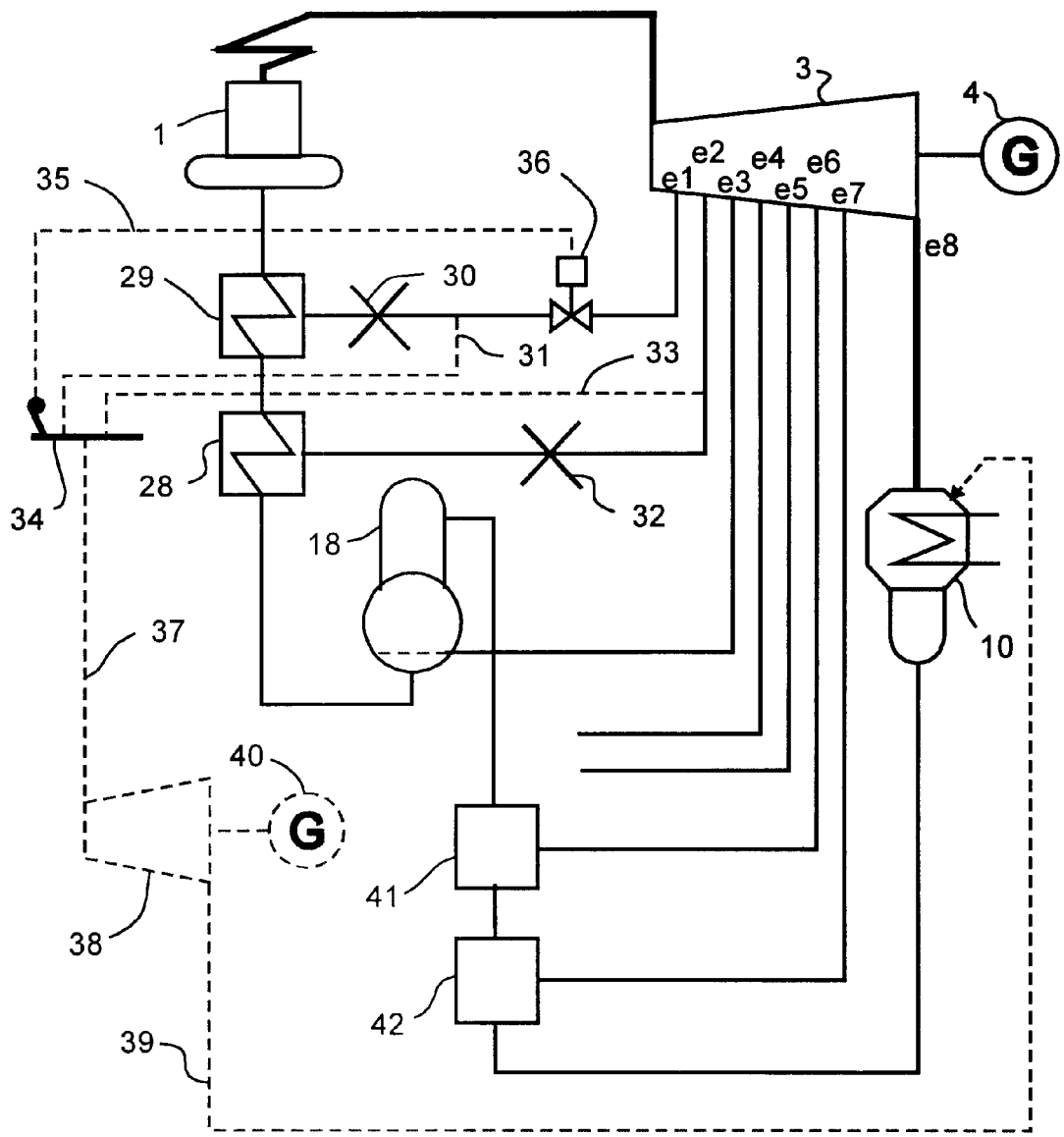
Figure 21:
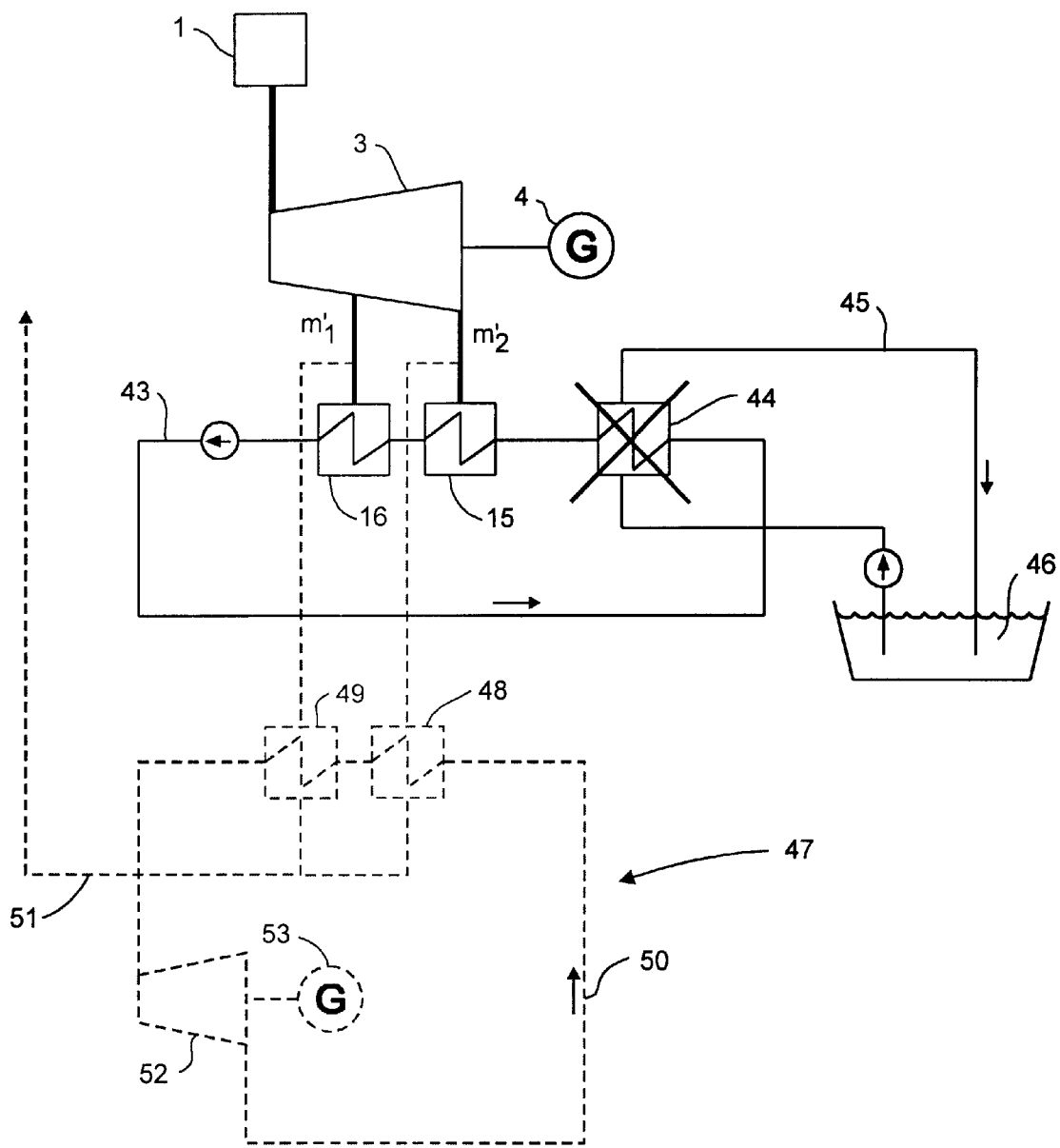
Figure 22:
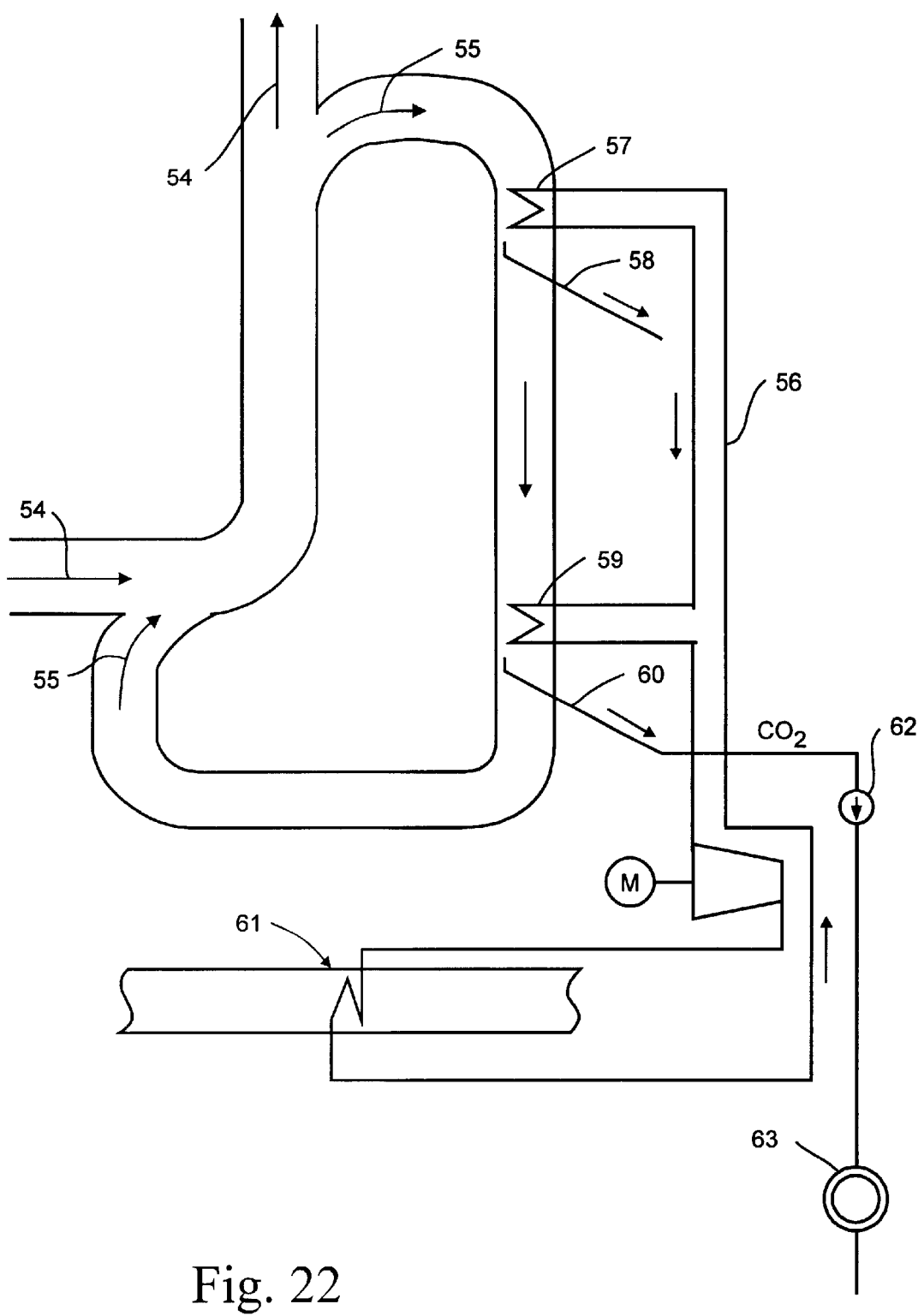

In the solutions of FIGS. 17 and 18, a combination of three modules M1/M1/M2 or M1/M2/M2 are used, respectively, involving the overcapacity (regulation need) area R3 of the third module, too.

In the plants with more than one module, selections may be made also between more expensive axial turbines and less expensive throttle controlled turbines because normally it is enough that one turbine is controlled. Because both modules are operating with the same parameter, it is possible to share the need of control of the boilers between therebetween. This improves the efficiency of the boilers.

The electric power of the modules could be 3, 5, and 7 MW, for example. With a plant of higher power, a reasonable alternative for a diesel as a peak-load engine is a gas turbine.

The invention may vary within the scope of the accompanying claims.

What is claimed is:

1. A method for optimally operating co-generation of electricity and heat in which a district heating power range is divided into a lower heating power range and a higher heating power range, comprising:

providing base load electricity and regulation electricity produced with a steam turbine with operating parameters of a condensing turbine, wherein producing the lower heating power range mainly by heat pumps using anergy of exhaust steam of the steam turbine as an energy source, producing peak-load power and wintertime regulation electricity with a peak-load engine, producing the higher heating power range partially by heat pumps using said anergy as the energy source and partially by exhaust gas heat of said peak-load engine;

producing both the electricity and the heat with a high fuel utilization rate and for increasing production of electricity in relation to production of heat;

producing a bigger amount of electricity of a fuel unit at an initial stage of operation of a district heating power plant; and producing extra peak power with the peak-load engine at short notice and with a good fuel utilization rate.

2. A method according to claim 1, wherein producing the lower heating power range includes cooling the exhaust steam of the steam turbine with a gas.

3. A method according to claim 1, wherein the steam turbine is operated with a final pressure of expansion and a temperature level of the exhaust steam that are lower than a conventional district heating power plant but higher than a condensing turbine with seawater cooling operating in cold regions, and are selected so that a value of the anergy discharged to a condenser is of no value and adverse effects caused to an environment by the heat going to the sea or other water system are minimized.

4. A method according to claim 1, wherein the steam turbine is operated with a final pressure of expansion and such a temperature level of the exhaust steam that are lower than with a conventional district heating power plant and, at a site where outdoor air is cooler than seawater, at least one of equal to and lower than those of a condensing turbine with seawater cooling, and are selected so that a value of the anergy discharged to a condenser is zero and adverse effects caused to the environment are minimized because the anergy is released to air.

5. A method according to claim 1, wherein providing base load and regulation electricity includes operating with an industrial company with a high cooling demand whereby carbon dioxide is used for cooling, and is obtained by cooling combustion gases for liquifying carbon dioxide.

6. A method according to claim 1 wherein providing base load and regulation electricity includes using return water of a district heating system as an auxiliary heat source for the heat pumps.

7. A method according to claim 6, wherein steam, after expansion in the steam turbine, is conducted through a new small-scale turbine to a condenser and not to a feedwater preheater.

8. An optimally operating district heating power plant for co-generation of electricity and heat, comprising:

a steam power plant part with a steam turbine with operation parameters of a condensing turbine for producing base load electricity and regulation electricity;

a first heat pump plant configured to produce a lower district heating power range by using anergy of exhaust steam of said steam turbine as an energy source;

a peak-load engine configured to produce mainly peak-load power and wintertime daily peak-load electricity;

means for recovering heat of an exhaust gas of the peak-load engine;

a second heat pump plant using the anergy of the exhaust steam of said steam turbine as an energy source for producing higher district heating power range partially by said anergy and partially by exhaust gas heat of the peak-load engine;

means for producing base load electricity and heat with a high fuel utilization rate and increase production of base load electricity in relation to production of heat;

means for producing greater amounts of electricity from a fuel unit at an initial stage of operation of the district heating power plant; and means for producing extra peak power with the peak-load engine at short notice and with a good fuel utilization rate.

9. An optimally operating district heating power plant according to claim 8, further comprising means for storing heat for short term peak loads.

10. An optimally operating district heating power plant according to claim 8, further comprising means for cooling the exhaust steam of the steam turbine with gas.

11. An optimally operating district heating power plant according to claim 8, wherein the steam power plant part includes a previous district heating power plant with a low-pressure chamber with a longer expansion for producing condensing electricity.

12. An optimally operating district heating power plant according to claim 8, wherein a boiler of an existing power plant is replaced with a cooling unit for cooling exhaust gases that makes feedwater preheaters needless, and steam, after expansion in the steam turbine, is directed to a small-scale turbine connected to a condenser and not to a feedwater preheater.

13. An optimally operating district heating power plant according to claim 8, further comprising a cooling unit for cooling combustion gases and making liquified carbon dioxide so that the district heating power plant can provide an industrial company with a high cooling demand that relies on liquified carbon dioxide for cooling.

14. An optimally operating district heating power plant according to claim 8, wherein an existing heating power plant is provided with the peak-load engine, exhaust gas heat recovery equipment and heat pump solution of the optimally operating district heating power plant, and means for using return water of a district heating system as an auxiliary heat source for the heat pumps.

15. An optimally operating district heating power plant according to claim 8, further comprising an auxiliary cooling arrangement for production of extra electricity, wherein said auxiliary cooling arrangement is at least one of a Boost Energy Converter and other equipment based on Rankine cycle which produce extra electricity by lowering the enthalpy level.

* * * * *